(12) United States Patent
Nagao et al.

(10) Patent No.: US 6,606,830 B2
(45) Date of Patent: *Aug. 19, 2003

(54) SOLAR CELL-BEARING ROOF AND METHOD FOR INSTALLING SOLAR CELL-BEARING ROOF

(75) Inventors: Yoshitaka Nagao, Soura-gun; Kimitoshi Fukae; Tatsuo Fujisaki, both of Nara; Fumitaka Toyomura, Kyotanabe; Shigenori Itoyama, Nara, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 136 days.

(21) Appl. No.: 09/200,868

(22) Filed: Nov. 27, 1998

(65) Prior Publication Data

US 2001/0034982 A1 Nov. 1, 2001

(30) Foreign Application Priority Data

Nov. 27, 1997 (JP) ............................................. 9-326237

(51) Int. Cl.$^7$ ................................................ H01L 25/00
(52) U.S. Cl. ........................ 52/173.3; 136/244; 136/291
(58) Field of Search .................................. 136/243, 245, 136/252, 256, 290–293; 126/621–627; 52/173.3, 537, 509

(56) References Cited

U.S. PATENT DOCUMENTS

| | | | | |
|---|---|---|---|---|
| 5,092,939 A | * | 3/1992 | Nath et al. | 52/509 X |
| 5,232,518 A | * | 8/1993 | Nath et al. | 52/509 X |
| 5,409,549 A | * | 4/1995 | Mori | 52/173.3 X |
| 5,990,414 A | * | 11/1999 | Posnansky | 52/173.3 X |
| 6,063,996 A | * | 5/2000 | Takada et al. | 52/173.3 |
| 6,065,256 A | * | 5/2000 | Joko et al. | 52/173.3 |
| 6,075,202 A | * | 6/2000 | Mori et al. | 52/173.3 X |
| 6,093,884 A | * | 7/2000 | Toyomura et al. | 52/173.3 X |

FOREIGN PATENT DOCUMENTS

| | | | | |
|---|---|---|---|---|
| DE | 3247467 | * | 7/1984 | 52/173.3 |
| JP | 2-565611 | | 9/1993 | |

* cited by examiner

*Primary Examiner*—Richard Chilcot
(74) *Attorney, Agent, or Firm*—Fitzpatrick, Cella, Harper & Scinto

(57) ABSTRACT

A solar cell-bearing roof includes a roof base member provided on a partition wall which partitions a building into an indoor portion and an outdoor portion, a solar cell module provided on the roof base member, and electric wiring with one end portion being electrically connected with the solar cell module. The end portion of the electric wiring is drawn to the outside from between the roof base member and the solar cell module and at an outdoor-sided position than an indoor side face of the partition wall.

236 Claims, 17 Drawing Sheets

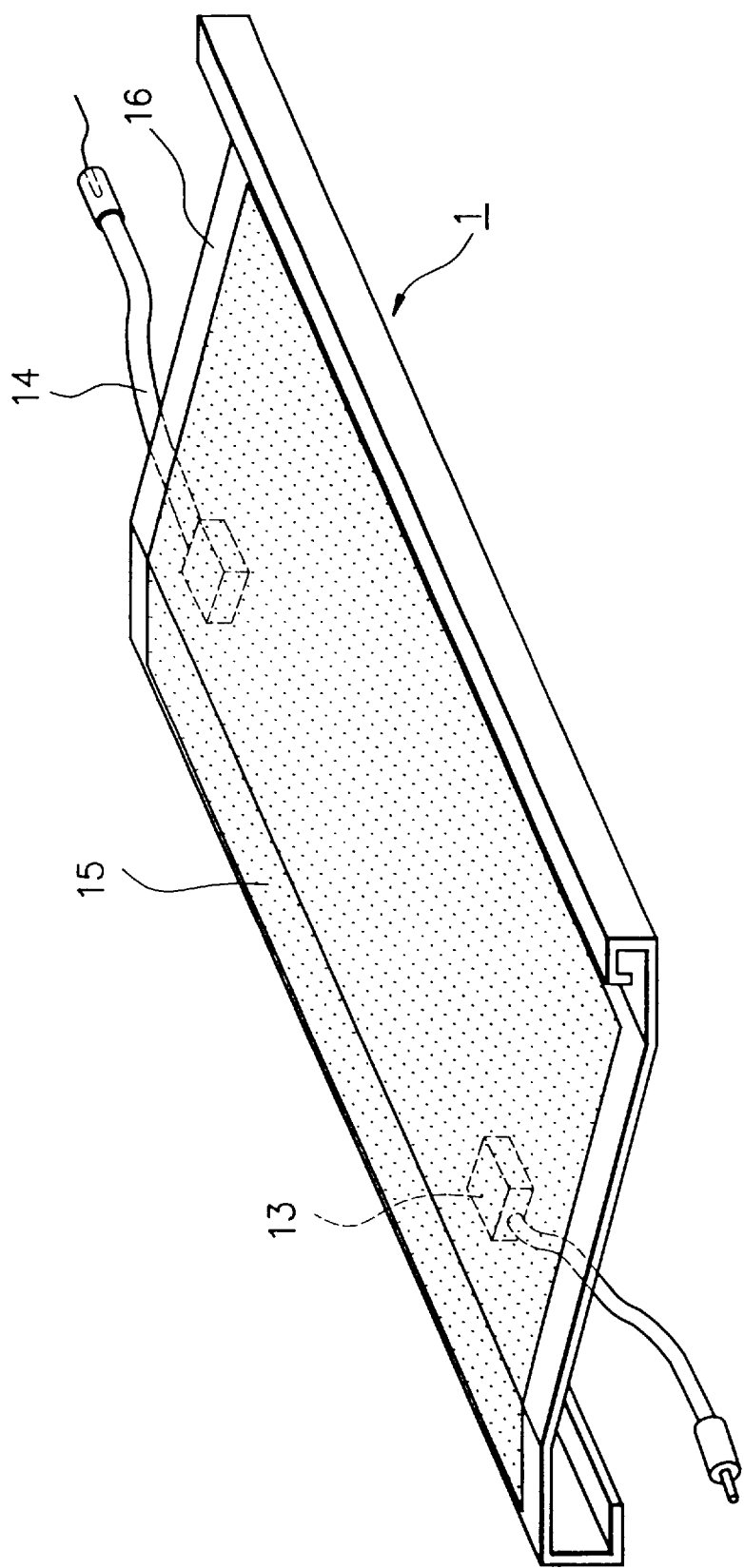

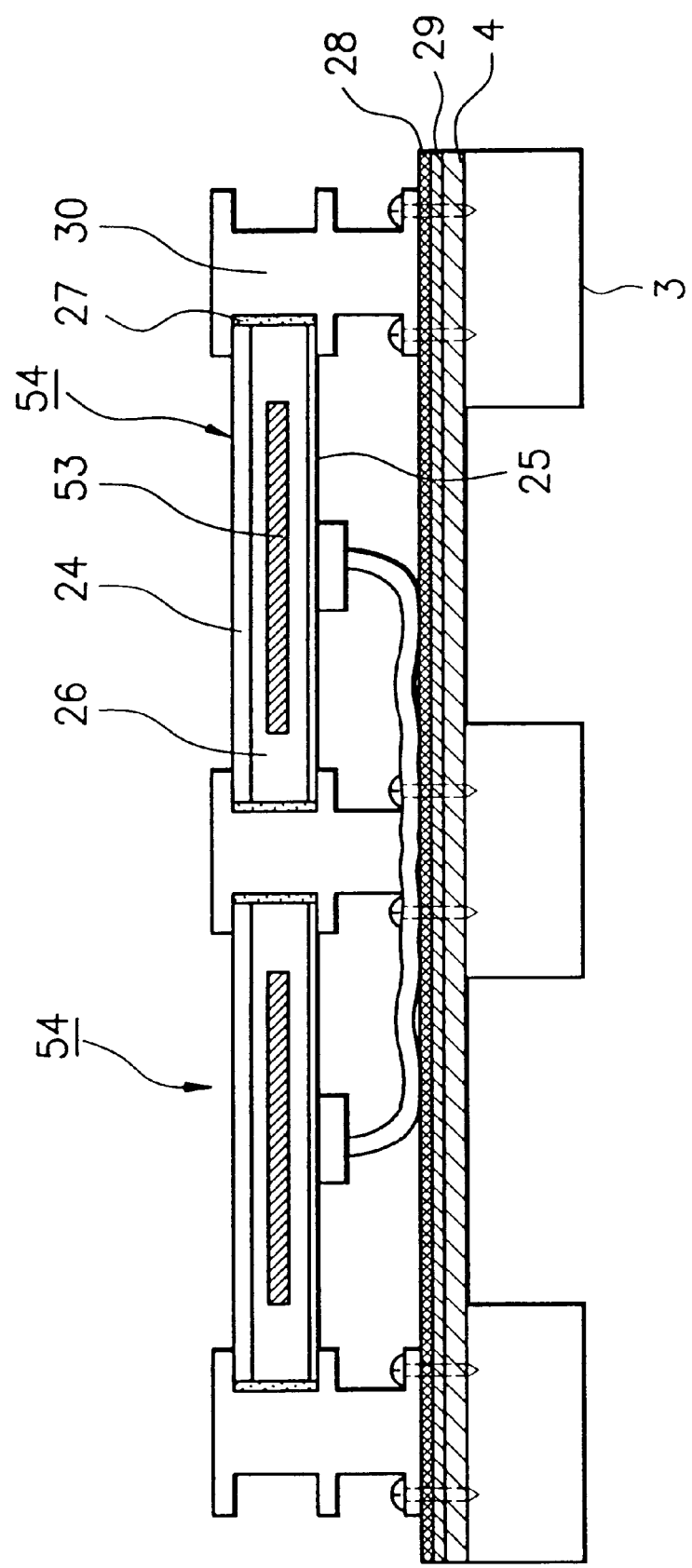

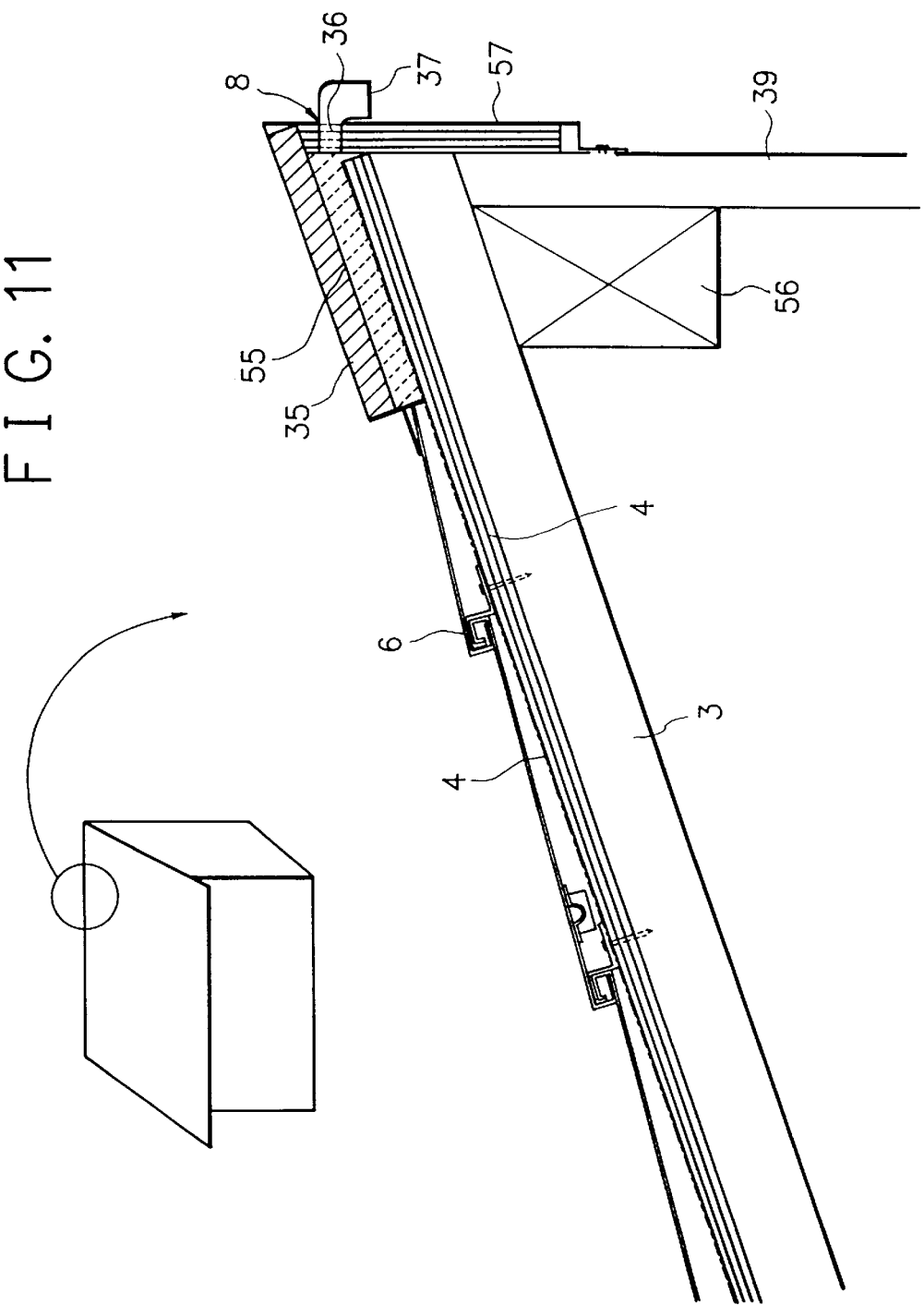

SOLAR CELL-BEARING ROOF AND METHOD FOR INSTALLING SOLAR CELL-BEARING ROOF

BACKGROUND OF THE INVENTION

1. Field of the Invention

The present invention relates to a solar cell-bearing roof comprising a solar cell module for a building and a method for installing the roof. The present invention also relates to a building comprising the solar cell-bearing roof and a power generation system comprising the solar cell-bearing roof.

2. Related Background Art

In recent years, earth warming phenomenon due to fumes emitted from the steam-power plants, fear of fossil fuel being exhausted, and radioactive contamination due to accident at or radioactive waste from the atomic power plants have been internationally discussing in terms of the earth. And the public concern about the global environment and energy has been rapidly increasing.

Under this circumstance, public attention has now focused on and various studies have been made on the power generation system using a solar cell since it has advantages: it is a clean power generation system which is free of the problems relating to radioactive contamination, earth-warming and environmental pollution, the sunlight to be used as its energy source reaches everywhere on the earth, there is no problem for the energy source to be localized, and it is expected to be a future power generation source.

As such a power generation system, there have been a variety of solar cell modules which can be installed on a roof of a building. Some of them have been practically used.

In order for such a solar cell module to be installed on a roof of a building, there are known, for instance, a manner of installing a fixing member or a trestle on a roof of a building and fixing a solar cell module on said fixing member or trestle and a manner of providing a solar cell module comprising a photovoltaic element integrated with a roofing member such as a roof tile or a metal roofing member and installing said solar cell module on a sheathing roof board.

The solar cell module is usually structured such that electric wirings comprising a cable are connected to the rear face side opposite the light receiving face side so as to output electric power. And, generally, a plurality of solar cell modules having such structure are arranged and they are electrically connected with each other by way of electric-wiring. The power outputted from a plurality of solar cell strings each comprising a plurality of solar cell modules being electrically connected with each other are guided into a connection box, where they are connected in parallel to each other. The power outputted from the connection box is guided into a so-called inverter as a power converter, where it is converted into an alternate current, followed by being used in a load device of a domestic power-receiver or by back-flowing to an electric power company. Such inverter is provided inside the house or it is provided outdoors in view of heat or noise generated thereby.

In the case where the inverter is provided inside the house, for solar cell modules arranged on a sheathing roof board constituting a roof base member or a previously formed roof comprising a roofing member laid on a roof base member, in order to electrically connect electric wirings from said solar cell modules to the connection box and the inverter, the electric wirings are necessary to be led-in inside the house. In order to facilitate this work, Japanese Patent No. 2565611 proposes that a ventilation layer is provided between a sheathing roof board and a roof panel, an power output cable from a solar cell is passed through the space of the ventilation layer, followed by introducing into a house on the ridge portion side.

However, in such conventional manner of leading-in the electric wirings inside the house, there is a disadvantage such that penetration holes are necessary to be provided at a waterproofed means provided at a ridge portion or the like of a building and which is situated above the indoor space, namely, at the roof face situated at the ridge portion, where the waterproof reliability of the building is likely to be deteriorated. Further, in the conventional case where the inverter is installed outdoors, there is a disadvantage such that after the electric wirings are once led-in inside the building, they are necessary to be taken out to the outside, where the arrangement of the electric wirings is complicated. In addition to this, there are also a disadvantage such that the wiring works are required to be conducted at the time of roof covering, and because of this, previous preparation of day's schedule and the like is necessary.

SUMMARY OF THE INVENTION

A principal object of the present invention is to eliminate the foregoing disadvantages found in the prior art and to provide a solar cell-bearing roof comprising a solar cell module sealed therein and which enables one to draw electric wiring from said solar cell module to the without deteriorating the waterproof reliability of the roof and a method for installing said roof.

Another object of the present invention is to provide a solar cell-bearing roof comprising a solar cell module sealed therein and which enables one to readily install said solar cell-bearing roof on a building and readily check the electric system of the roof installed on the building.

A further object of the present invention is to provide a solar cell-bearing roof comprising a solar cell module which is installed on a building such that electric wiring from the solar cell module of the roof is wired outside the building so that the waterproof ability and the resistance to thunderbolt are ensured.

A further object of the present invention is to provide an execution method of installing the above solar cell-bearing roof on a building.

A further object of the present invention is to provide a power generation system comprising the above solar cell-bearing roof.

BRIEF DESCRIPTION OF THE DRAWINGS

FIG. 1 is a schematic slant view illustrating the constitution of an example of a solar cell module which can be used in the present invention.

FIG. 6 is a schematic cross-sectional view illustrating a solar cell-bearing roof in a second example of the present invention.

FIG. 11 is a schematic cross-sectional view illustrating a ridge portion of a solar cell-bearing roof in a sixth example of the present invention.

DETAILED DESCRIPTION OF THE INVENTION AND PREFERRED EMBODIMENTS

Figure 2A:
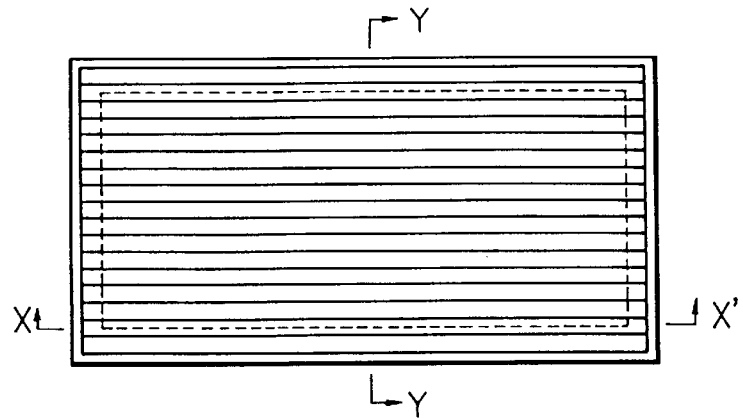
FIGS. 2(A) to 2(C) are schematic views illustrating an embodiment of a solar cell-bearing roof according to the preset invention.

The present invention is to eliminate the foregoing problems found in the prior art and to attain the above described objects.

The present invention provides a solar cell-bearing roof comprising a solar cell module and an execution method for installing said solar cell-bearing roof on a building.

A typical embodiment of the solar cell-bearing roof according to the present invention comprises a roof base member provided on a partition wall of a building, said partition wall partitioning said building into an indoor portion and an outdoor portion; a solar cell module provided on said roof base member; and an electric wiring whose one end portion being electrically connected to said solar cell module between said roof base member and said solar cell module, wherein the other end portion of said electric wiring is drawn to the outside from between said roof base member and said solar cell module and at an outdoor-sided position than an indoor side face of the partition wall.

A typical embodiment of the execution method for installing a solar cell-bearing roof according to the present invention comprises the steps of: providing a solar cell module on a roof base member provided on a partition wall of a building, said partition wall partitioning said building into an indoor portion and an outdoor portion; electrically connecting one end portion of an electric wiring to said solar cell module between said roof base member and said solar cell module; and drawing the other end of said electric wiring to the outside from between said roof base member and said solar cell module and at an outdoor-sided position than an indoor side face of said partition wall.

In the present invention, the term "outdoor-sided position than the indoor side face of the partition wall" means an outdoor-sided position than an interior-finished face of the building's partition wall, specifically, an eaves side or a verge side of the building.

According to the constitution of the present invention, no throughhole is formed at the roof face or roof base member situated above the indoor space of the building and because of this, there is no fear for leaking of rain and the like. In the case where the solar cell module is electrically grounded by way of battery wiring, the earthing can be directly conducted without pulling the battery wiring into the indoor of the building and because of this, there can be attained excellent resistance to thunderbolt. And the electric work at the time of installing the solar cell-bearing roof can be conducted separately from the roofing work and because of this, the workability is high. Further, the lead-in points are situated at an outdoor position, e.g. at the reverse of the eaves or the like and because of this, checking the electric system can be readily conducted as desired.

The present invention includes a power generation system and a building each comprising the foregoing solar cell-bearing roof.

A typical embodiment of the power generation system according to the present invention comprises a solar cell-bearing roof comprising a solar cell module which is provided on a roof base member provided on a partition wall of a building, said partition wall partitioning said building into an indoor portion and an outdoor portion; an electric wiring whose one end portion being electrically connected with said solar cell module between said roof base member and said solar cell module, the remaining end portion of said electric wiring being drawn to the outside from between said roof base member and said solar cell module and at an outdoor-sided position than an indoor side face of said partition wall; and an inverter to which the drawn remaining end portion of said electric wiring is electrically connected.

A typical embodiment of the building according to the present invention comprises a partition wall of a building, said partition wall partitioning said building into an indoor portion and an outdoor portion; a roof base member provided on said partition wall; a solar cell module provided on said roof base member; and an electric wiring whose one end portion being electrically connected with said solar cell module, wherein the remaining end portion of said electric wiring is drawn to the outside from between said roof base member and said solar cell module and at an outdoor-sided position than an indoor side face of said partition wall.

In the following, the present invention will be detailed with reference to the drawings.

FIG. 1 is a schematic slant view illustrating the constitution of an example of a solar cell module which can be used in the present invention. In FIG. 1, reference numeral 1 indicates a solar cell module, reference numeral 13 a terminal box, reference numeral 14 an electric wiring material constituting electric wiring, reference numeral 15 a solar cell (a photovoltaic element), and reference numeral 16 a supporting means.

As shown in FIG. 1, the solar cell module 1 comprises a solar cell 15 (a photovoltaic element) formed on a supporting means 16 while being sealed. At the rear face of the solar cell module 1, there are provided a pair of terminal boxes 13 for outputting an electric power. To each terminal box 13, an electric wiring material 14 constituting electric wiring is connected.

Figure 2B:
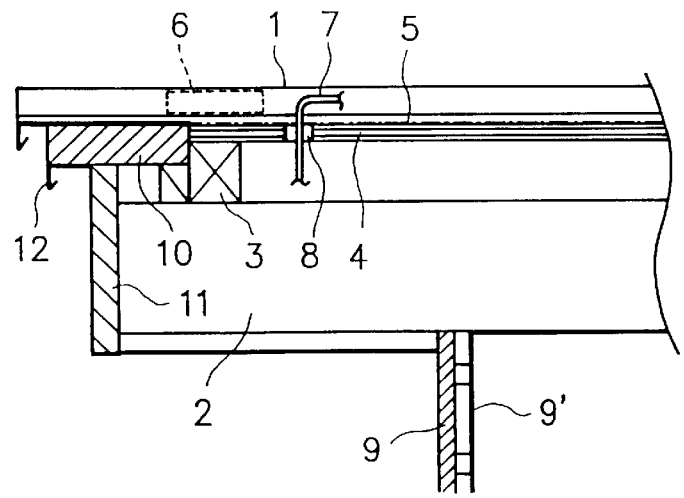
Figure 2C:
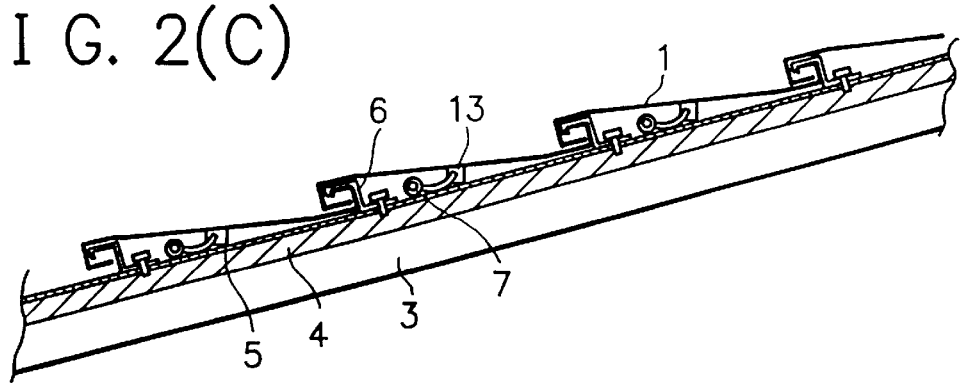

FIGS. 2(A) to 2(C) are schematic views illustrating an embodiment of a solar cell-bearing roof according to the present invention comprising a plurality of solar cell modules having such configuration as shown in FIG. 1 which are arranged on a roof face. FIG. 2(A) is a schematic roof plan, FIG. 2(B) is a partially omitted cross-sectional view, taken along the line X–X' in FIG. 2(A), and FIG. 2(C) is a partially omitted cross-sectional view, taken along the line Y–Y' in FIG. 2(A). As shown in FIGS. 2(B) and 2(C), a rafter 3 is fixed to a roof purlin 2 and a sheathing roof board 4 is laminated on the rafter 3, whereby a roof face is configured. On the sheathing roof board 4, a plurality of integrated roofing member type solar cell modules 1 are fixed through an underlayment by means of fixing members 6 comprising a clip.

A space is provided between the roof face and each solar cell module 1, namely, between the sheathing roof board 4 as the roof base member and each solar cell module 1. In the space, a wiring material 7 is arranged. The wiring material 7 is used for being electrically connected to the solar cell module 1 and for earthing the solar cell module 1. The wiring material 7 includes an electric wiring for outputting an electric power from the solar cell module 1. In the space, the wiring materials 7 which are connected to the respective solar cell modules 1 are connected with each other and they are arranged so that they can be drawn to the outdoor.

And as shown in FIG. 2(B), the sheathing roof board 4 is provided with a throughhole 8 for drawing the wiring material 7 between the sheathing roof board 4 and the solar cell module 1. The throughhole 8 is formed at an outdoor-sided position rather than an indoor side face 9' of a partition wall 9 which partitions an indoor portion and an outdoor portion. Through the throughhole 8, the wiring material 7 is drawn to the rear face of the sheathing roof board 4. In FIG. 2(B), reference numeral 2 indicates a principal structure portion, reference number 10 a wide lath, reference numeral 11 a verge-board, and reference numeral 12 a verge plamette.

In the following, description will be made of each constituent factor in the present invention.

Solar Cell Module

As shown in FIG. 1, the solar cell module 1 used in the present invention comprises a solar cell 15 formed on a supporting means 16 while being sealed. The supporting means 16 comprises a steel plate whose two side portions are bent, where the solar cell is integrated with the supporting means comprising the steel plate as a roofing member. In the present invention, the supporting means may comprise a glass plate or a film. In this case, the solar cell module is of a configuration that the solar cell is supported from the light receiving face side. Alternatively, it is possible for the solar cell module to be configured such that a frame comprising an aluminum or the like is provided at the periphery of the supporting means in order to improve the mechanical strength.

In the present invention, besides the case where the solar cell module is provided on the sheathing roof board as shown in FIGS. 2(A) to 2(C), the solar cell module may be provided on a conventional roofing member comprising a steel plate or the like on a structural material having a roofing function.

For the solar cell 15 of the solar cell module 1, there is no particular limitation. For instance, the solar cell may be a silicon semiconductor solar cell such as a single crystalline silicon solar cell, a polycrystalline silicon solar cell or an amorphous silicon solar cell; or a compound semiconductor solar cell such as a III-V group compound solar cell, a II-V group compound solar cell or a I-III-V group compound solar cell. Besides, solar cells comprising a combination of two or more of the foregoing materials are also usable.

Of the above-mentioned solar cells, the amorphous silicon solar cell is particularly suitable in the present invention for the following reasons. That is, the amorphous silicon solar cell can be formed in a thin film state on a film substrate or an electrically conductive substrate and because of this, the solar cell itself can be of light weight. In addition, the amorphous silicon solar cell has a better power outputting performance at high temperature that that of the crystalline series solar cell and because of this, it is optimum when provided on a roof or the like which is heated to a high temperature. Further in the case of an amorphous solar cell formed on an electrically conductive substrate, the amorphous solar cell has excellent structural strength and desirable flexibility. Hence, the amorphous solar cell has a high form freedom and it can be desirably installed on a given roof face even if it has a curved portion such as camber or concave upward.

In the case where the solar cell has a surface protective member comprising not a glass plate but a weatherproof film and a back face reinforcing member comprising, for instance, a steel plate which is used in a metal roof, it can be bent as well as the metal roof. Specifically, the solar cell in this case may be configured in an appropriate form such as a waved plate form, a batten seam form, or a form for stepping roof. The solar cell thus configured also has a function as a roofing member for waterproof or the like and because of this, the total cost required in the case of constructing a building or reforming a building using a roofing member comprising a solar cell module can be reduced.

Sheathing Roof Board

The sheathing roof board 4 is corresponding to a backing member which is continuously provided over the entire roof face for installing a roofing member. The sheathing roof board functions as a structural body which receives a dead load on the roof. The sheathing roof board comprises a plywood, a cemented excelsior board, a cemented woodchip board, a gypsum board or a glass wool board. Some of these have a heat insulating property. These materials as the sheathing roof board may be integrated with the rafter into a roof panel. In the present invention, the sheathing roof board may comprise any of the foregoing materials as long as it can fix the solar cell module.

Underlayment

The underlayment 5 is provided when the roofing member is provided on the surface of the sheathing roof board, in order to improve the waterproof ability of the roof. The underlayment is not necessary to be provided in the case where sufficient waterproof is attained by way of the roofing member and the sloped roof. However, in any case, the underlayment is usually provided as a supplementary waterproof means. In the present invention, there is no particular limitation for the underlayment. The underlayment can include, for example, asphalt shingle roofing, asphalt felt, and the like.

Wiring Material

For the wiring material 14 (that is, the electric wiring) in the present invention, there is no particular limitation. The wiring material can include a cable-structured wire, a flat wire and a ribbon wire. Of these, the cable-structured wire is the most appropriate.

In any case, the wiring material (the electric wiring) is desired to endure against environmental conditions. Particularly, the wiring material is necessary to satisfy the requirements for it to be used under given environments such as heat resistance, cold resistance, mechanical strength, electrically insulating property, waterproof, oil proof, abrasion resistance, acid resistance, alkali resistance, and the like.

Specific examples of such wiring material in a cable structure form are 600 V polyethylene cables (EV, EE, CV, CE) of JIS C 3605 Standard; 600 VEP rubber insulative cables (PN, PV) of JIS C 3621 Standard; 600 V vinyl insulative vinyl sheath (flat) cables (VVR, VVF) of JIS C 3342 Standard; first to fourth type rubber insulative rubber cabtire cables (1CT, 2CT, 3CT, 4CT) of JIS C 3327 Standard; second to fourth type rubber insulative chloroprene cabtire cables (2RNCT, 3RNCT, 4RNCT) of JIS C 3327 Standard; second to fourth type EP rubber insulative chloroprene cabtire cables (2PNCT, 3PNCT, 4PNCT) of JIS C 3327 Standard; and vinyl insulative vinyl cabtire cable of JIS C 3312 Standard.

Wire-Drawing Means

The wire-drawing means in the present invention comprises a throughhole formed, for instance, at the sheathing roof board as the roof base member at its outdoor-sided position rather than the indoor side face of the partition wall, where the throughhole serves to allow the wiring material to be drawn therethrough. Besides this, it is possible for the throughhole as the wire-drawing means to be formed at an eaves ridge covering member such as wide lath, fascia board or drip board or a gable covering member as the roof base member.

In the case of a shed roof, the thoughhole may be formed at a ridge covering member as the roof base member. Alternatively, in order to make the wiring material to be readily passed through, a protective member comprising a pipe or the like may be provided at the throughhole.

The features and advantages of the present invention will be described in more detail with reference to examples. It should be understood that these examples are only for illustrative purposes and the scope of the present invention is not restricted to these examples.

EXAMPLE 1

This example indicates a ribbed seam roof in which the present invention is applied.

Figure 3:
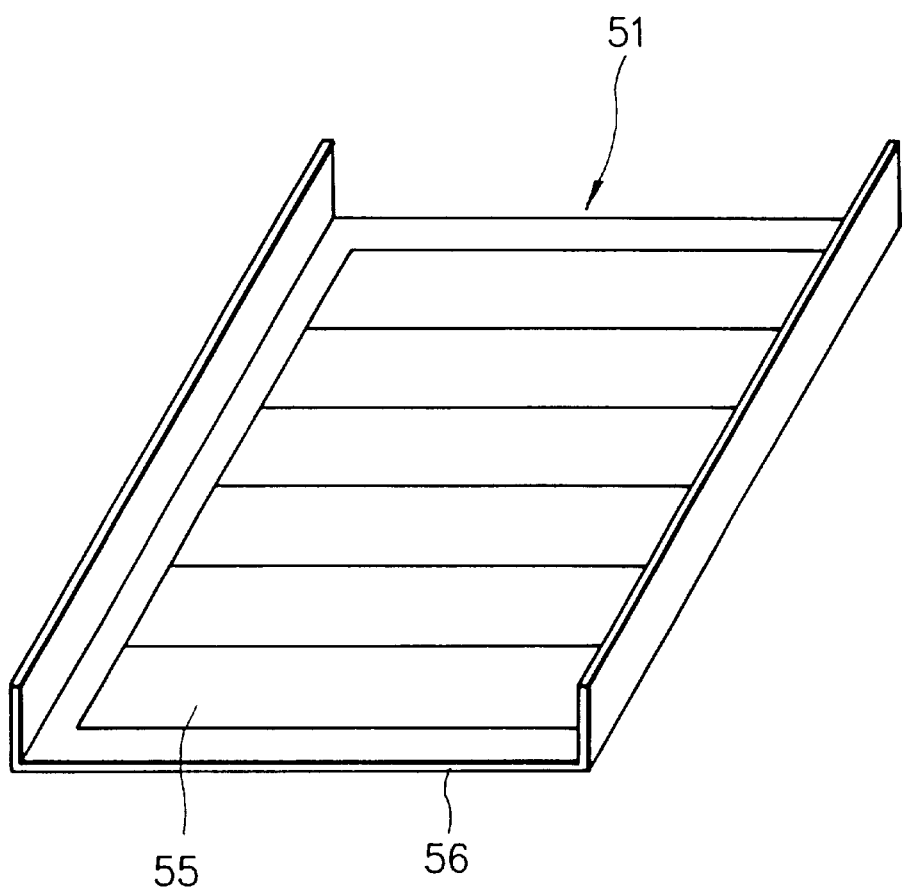
FIG. 3 is a schematic slant view illustrating a solar cell module used in a first example of the present invention.
Figure 4:
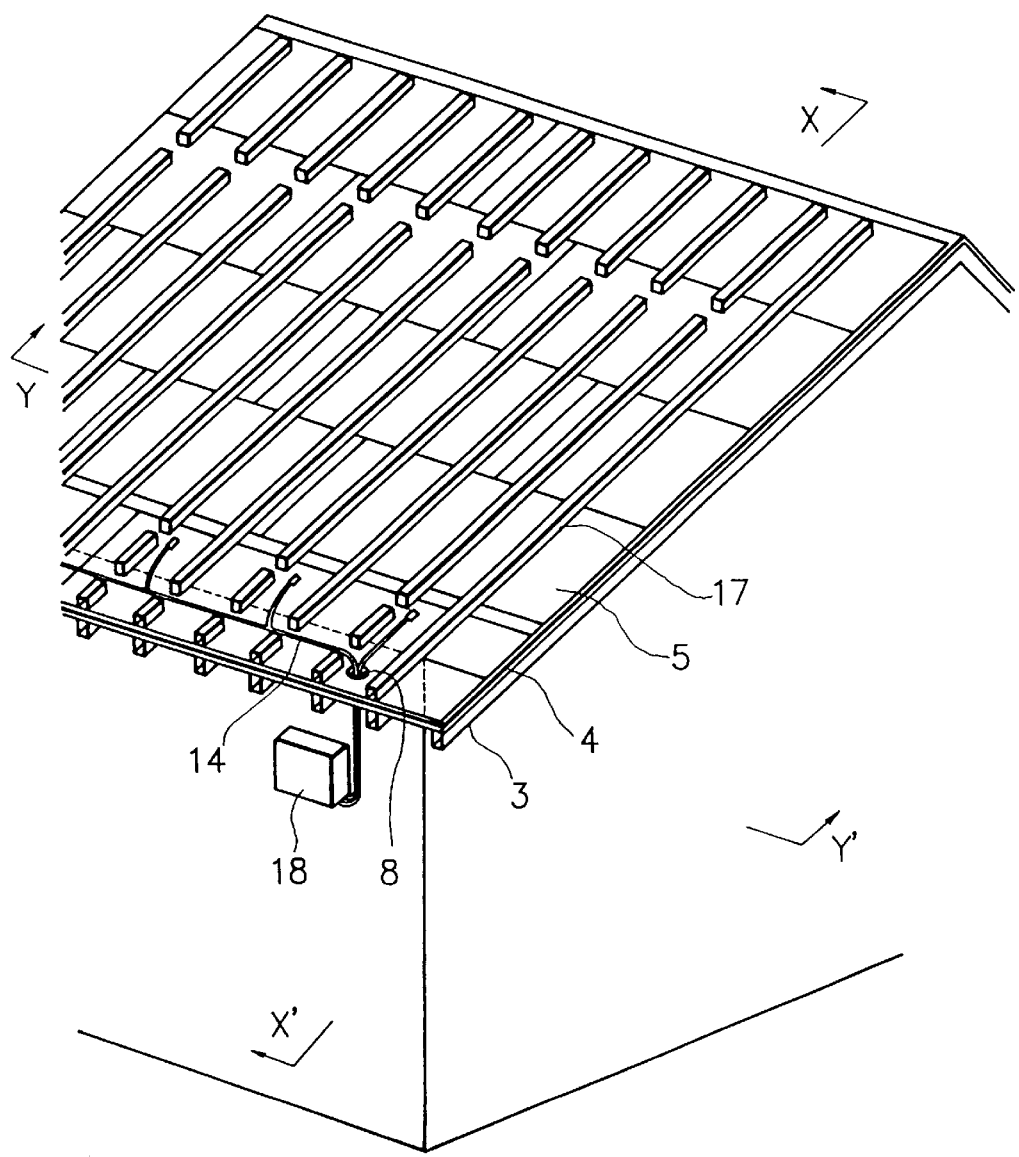
FIG. 4 is a schematic slant view of a roof before the solar cell module is fixed thereto in the first example of the present invention.
Figure 5A:
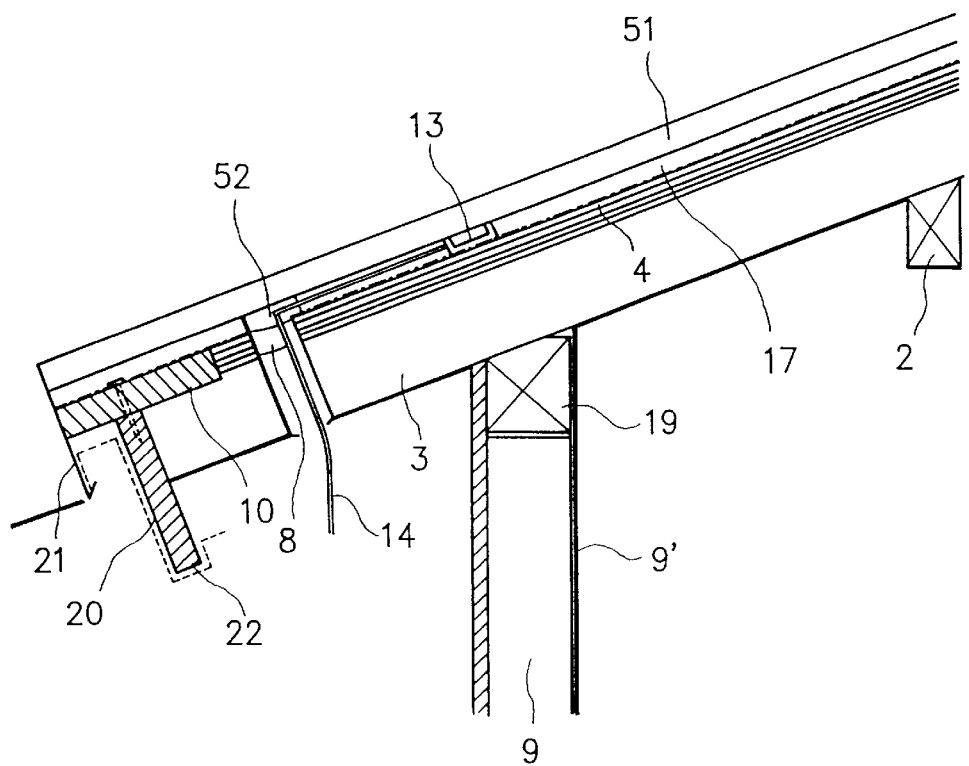
FIGS. 5(A) and 5(B) are schematic cross-sectional views of the roof having the solar cell module fixed thereto in the first example of the present invention.
Figure 5B:
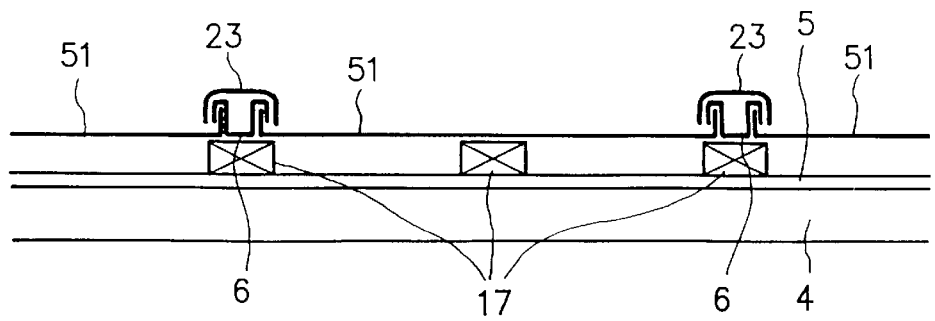

FIG. 3 is a schematic slant view illustrating a solar cell module used in this example. FIG. 4 is a schematic slant view of a roof before the solar cell module is fixed thereto in this example. FIG. 5(A) is a schematic cross-sectional view, taken along the line X–X' in FIG. 4, of the roof (shown in FIG. 4) having the solar cell module fixed thereto. FIG. 5(B) is a schematic cross-sectional view, taken along the line Y–Y' in FIG. 4, of the roof (shown in FIG. 4) having the solar cell module fixed thereto.

As shown in FIG. 3, the solar cell module 51 used in this example comprises a plurality of amorphous silicon solar cells 55 electrically connected with each other in series connection and arranged on a galvanizing-alloy coated steel member 56 while their surface being sealed by means of a weathering resin. In order to conform to a ribbed seam roof, opposite end portions of the galvanizing-alloy coated steel member 56 are upward bent as shown in FIG. 3.

In FIGS. 4, 5(A) and 5(B), reference numeral 2 indicates a principal structure portion, reference numeral 3 a rafter, reference numeral 4 a sheathing roof board, reference numeral 5 an underlayment, reference numeral 6 a clip, reference numeral 8 a throughhole, reference numeral 9 a partition wall, reference numeral 10 a wide lath, reference numeral 13 a terminal box, reference numeral 14 a wiring material, reference numeral 17 a spacer, reference numeral 18 a connection box, reference numeral 19 a pole plate, reference numeral 20 a fascia board, reference numeral 21 an eaves edge palmette, reference numeral 22 a fascia board, reference numeral 23 a stem cap, reference numeral 51 the solar cell module shown in FIG. 3, and reference numeral 52 a passage for a cable wire, which is provided between the sheathing roof board 4 and the solar cell module 51.

In the building shown in FIGS. 4 and 5(A), in order to form a gable roof, rafters 3 were fixed on the principal structure portion 2 and the pole plate 19. Then, a cemented excelsior board as the sheathing roof board 4 was fixed on the rafters 3 by means of a drill vise. On the sheathing roof board 4, an asphalt roofing felt as the underlayment 5 was fixed by means of staple. On the underlayment 5, spacers 17 were spacedly fixed longitudinally at a pitch corresponding to about ½ of the width of the solar cell module 51. Here, for a portion of the spacer 17 which strikes the terminal box of the solar cell module, it was cut into a recessed shape.

For the sheathing roof board 4, at its outdoor-sided position rather than the indoor side face 9' of the partition wall 9 (specifically, at its position on the eaves side in this example), a throughhole 8 as the wire-drawing means was formed. And extension CV cables as the wiring material 14 were provisionally inlet to a position of taking out a positive power output terminal of a series connected solar cell module group and to a position of taking out a negative power output terminal of the solar cell module group from the lower part to the upper part of the sheathing roof board 4 through the throughhole 8. After this, the throughhole 8 was filled with a silicon calking material.

Thereafter, as the foregoing series connected solar cell group, a plurality of solar cell modules each comprising the solar cell module 51 shown in FIG. 3 were arranged while connecting with each other by means of their connection cables for outputting electric power from the solar cells contained therein and fixed by means of clips 6 as a fixing means, where the positive and negative power output terminals of the series connected solar cell module group were electrically connected to the respective extension CV cables as the wiring material 14 through the terminal box. And between each adjacent solar cell modules, a stem cap 23 was provided.

After roofing was conducted in this way, as shown in FIG. 4, the wiring material 14 comprising the extension CV cables was electrically connected to a connection box 18 provided on the outer wall face of the building.

According to the embodiment in this example, electric connection can be readily conducted and the electric wiring can be shortened. This situation makes the solar cell-bearing roof have an improved reliability.

EXAMPLE 2

In this example, the solar cell modules 51 comprising the amorphous silicon solar cell used in Example 1 were replaced by a plurality of glass-sealed solar cell modules each comprising a crystalline series solar cell, and the solar cell modules were installed on the sheathing roof board 4 as well as in Example 1.

Detailed description will be made with reference to FIG. 6.

The solar cell 53 in FIG. 6 comprises an integrated solar cell group prepared as follows. That is, fifteen crystalline silicon solar cells were provided. For each crystalline silicon solar cell, a grid electrode was formed thereon. Then, the fifteen crystalline silicon solar cells were integrated in series connection to obtain an integrated solar cell group.

The solar cell module 54 in FIG. 6 comprises a crystalline series solar cell module prepared by using the above integrated solar cell group as follows.

Using a surface protective member 24 comprising a glass plate and a back protective member 25 comprising a composite comprising an aluminum foil sandwiched between two moisture-resistant fluororesin films made of a Tedlar (trademark name, produced by Du Pont Company) [Tdlar/aluminum foil/Tedlar], the integrated solar cell group was sealed between the back protective member 25 and the surface protective member 24 using a filler comprising EVA (ethylene-vinyl acetate copolymer). And an aluminum frame 27 as a reinforcing member was fixed to the four peripheries of the resultant using an adhesive to obtain a crystalline series solar cell module 54.

In this way, there were prepared a plurality of crystalline series solar cell modules 54.

A cemented excelsior board was used as the sheathing roof board 4. As the underlayment, an asphalt roofing felt 29 and a steel plate 28 were used. And over the underlayment, the solar cell modules were arranged while their aluminum frames being connected with each other by means of earthing line. The earthing line and the power output wiring were wired through a wire-drawing means comprising a throughhole formed at a predetermined position of the sheathing roof board 4 corresponding to an eaves portion on the eaves edge side as well as in Example 1. The wiring was electrically connected to a power converter provided on the exterior of the building.

According to the embodiment in this example, electric connection can be readily conducted and the electric wiring can be shortened. Hence, the wiring resistance can be diminished, and electric power generated by the solar cells can be effectively utilized. In addition, the earthing line can be directly grounded without passing through the inside of the building and because of this, the freedom of design is increased and a safety structure can be attained.

EXAMPLE 3

Figure 7:
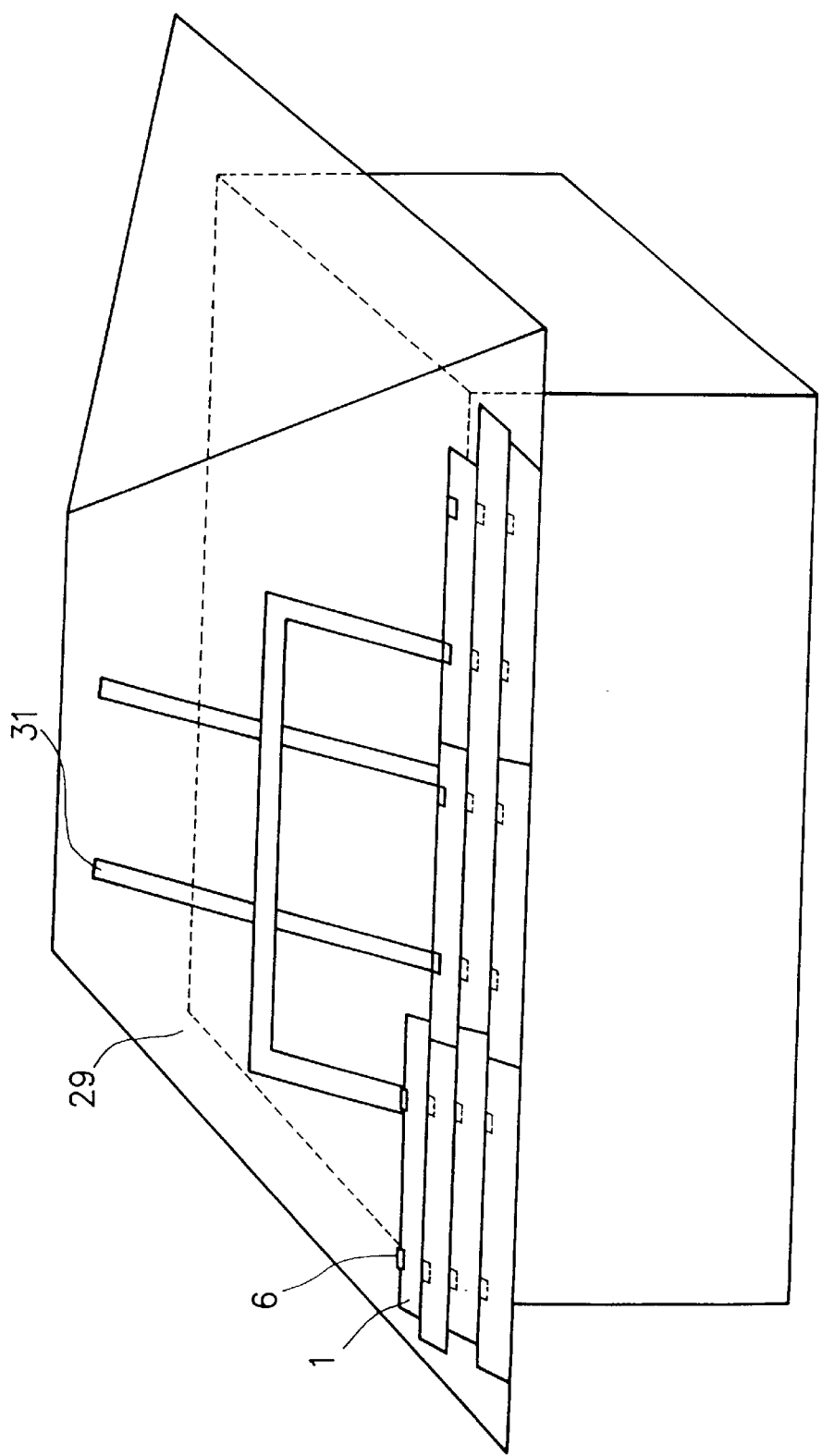
FIG. 7 is a schematic slant view illustrating a solar cell-bearing roof in a third example of the present invention.
Figure 8:
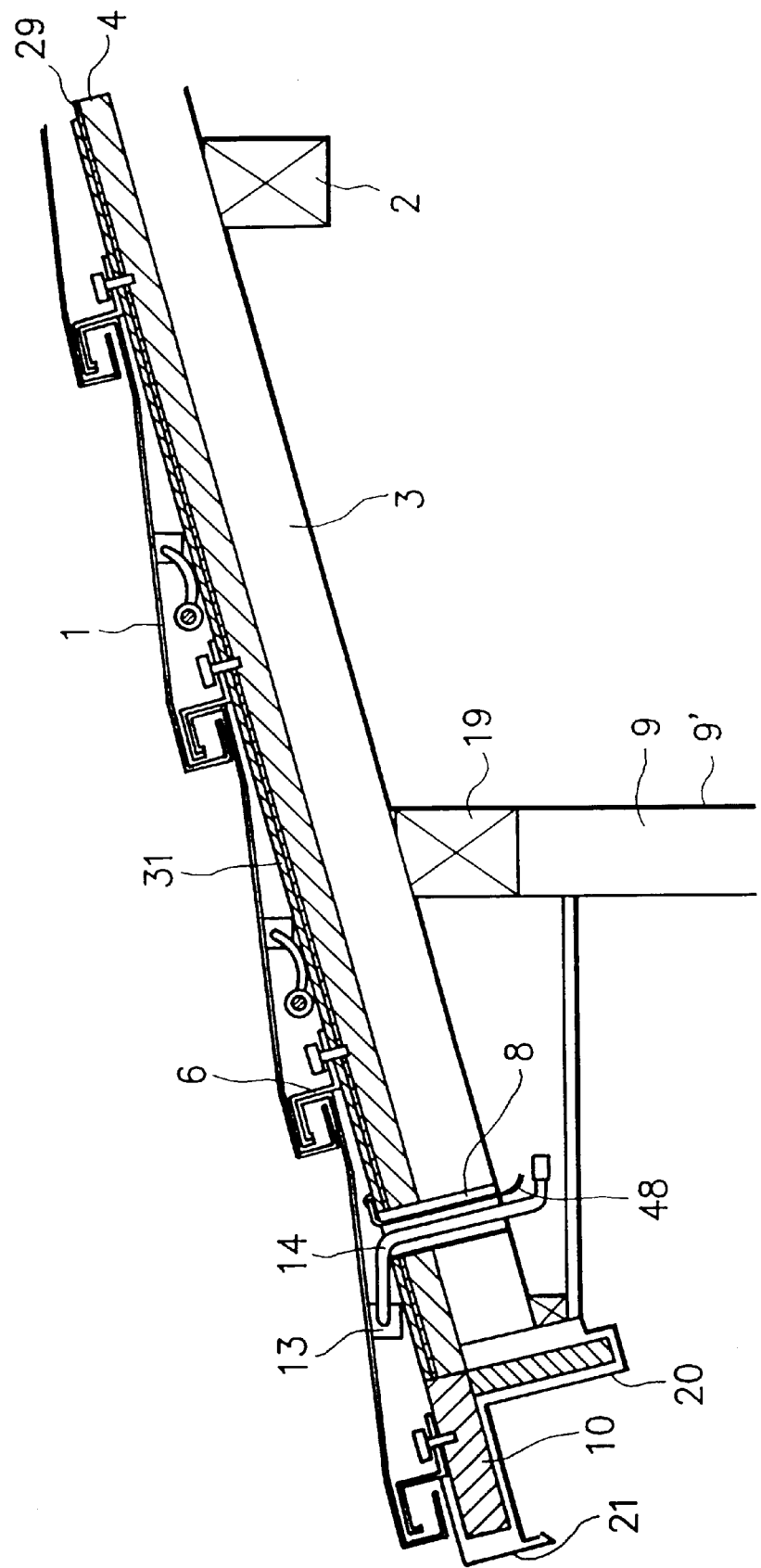
FIG. 8 is a schematic cross-sectional view of the solar cell-bearing roof shown in FIG. 7.

This example indicates a hip roof shown in FIG. 7 which is provided with a plurality of solar cell modules 1 of the configuration shown in FIG. 1 provided thereon. FIG. 8 is a schematic cross-sectional view of said hip roof.

In FIGS. 7 and 8, the constituents which are the same as those in FIGS. 4, 5(A) and 5(B) are added with the same reference numerals as in FIGS. 4, 5(A) and 5(B). Explanation of these constituents is omitted.

In this example, on the asphalt roofing felt 29 provided on the sheathing roof board 4, an earthing steel belt 31 is arranged. Each solar cell module 1 is fixed to the earthing steel belt 31 by means of the clip 6.

For the sheathing roof board 4, at its outdoor-sided position rather than the indoor side face 9' of the partition wall 9 (specifically, at its position on the eaves side in this example), the throughhole 8 as the wire-drawing means is formed. And the wiring material 14 is drawn to the outside through the throughhole 8.

In this configuration, each solar cell module 1 comprises a solar cell 15 formed on a steel plate as the supporting means 16 while being sealed as shown in FIG. 1. The steel plate constitutes a peripheral conductive portion of the solar cell module.

The solar cell modules 1 are integrated in series connection by electrically connecting their peripheral conductive portions with each other through the clips 6 and the earthing steel belt 31. To the earthing steel belt 31, an earthing wire 48 is connected. The earthing wire 48 is drawn to the rear of the eaves and extended to the ground, where it is electrically grounded by means of an earthing bar (not shown).

According to the embodiment of this example, earthing the solar cell module can be simply conducted. In addition, the wiring for the earthing is conducted separately from the wiring in the indoor and because of this, execution of work is efficient. And the configuration in this example has an improved resistance to thunderbolt.

EXAMPLE 4

This example indicates a gable roof in which the throughhole as the wire-drawing means is provided at its verge member.

Figure 9:
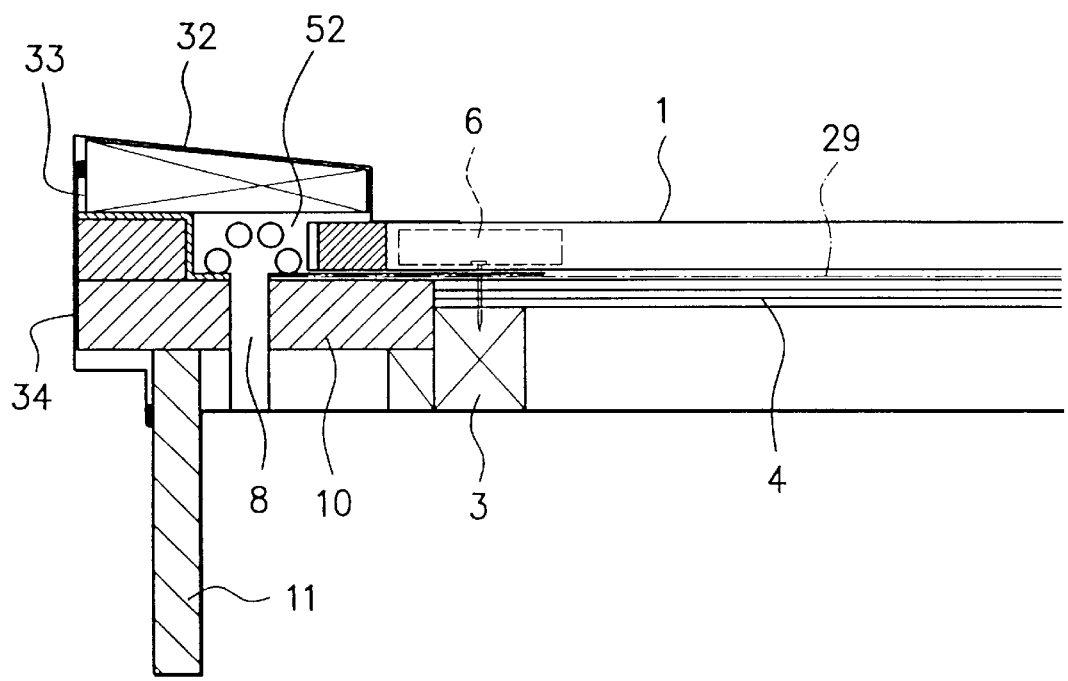
FIG. 9 is a schematic cross-sectional view illustrating a solar cell-bearing roof in a fourth example of the present invention.

FIG. 9 is a schematic cross-sectional view of a verge portion of the gable roof in this example. In FIG. 9, reference numeral 32 indicates a verge board, reference numeral 33 a drip board, and reference numeral 34 a verge cover. In FIG. 9, the constituents which are the same as those in FIGS. 5(A) and 8 are added with the same reference numerals as in FIGS. 5(A) and 8. Explanation of these constituents is omitted.

In this example, as shown in FIG. 9, on the sheathing roof board 4 comprising a cemented excelsior board, an asphalt roofing felt 29 is provided, and the solar cell module 1 (comprising a plurality of solar cell modules) is provided on the asphalt roofing felt 29. The wide lath 10 is provided at the verge portion, and the throughhole 8 as the wire-drawing means is formed at the wide lath 10.

The solar cell modules 1 are integrated in series connection by electrically connecting them with each other by means of the wiring material comprising a cable. The wiring material is passed through the cable wiring passage 52, drawn through the throughhole 8, and electrically connected to the inverter. Here, for the solar cell modules integrated in series connection, their peripheral conductive portions are electrically connected with each other through the clips 6 and an earthing steel belt (not shown) as well as in Example 3. To this earthing steel belt, an earthing wire (not shown) is electrically connected. The earthing wire is drawn to the outside through the throughhole 8 and it is electrically grounded.

In the embodiment of this example, the throughhole as the wire-drawing means is never provided over the inside space of the building or at a portion of the waterproof face situated near the inside space and because of this, the reliability of the waterproof ability is improved as desired.

EXAMPLE 5

Figure 10:
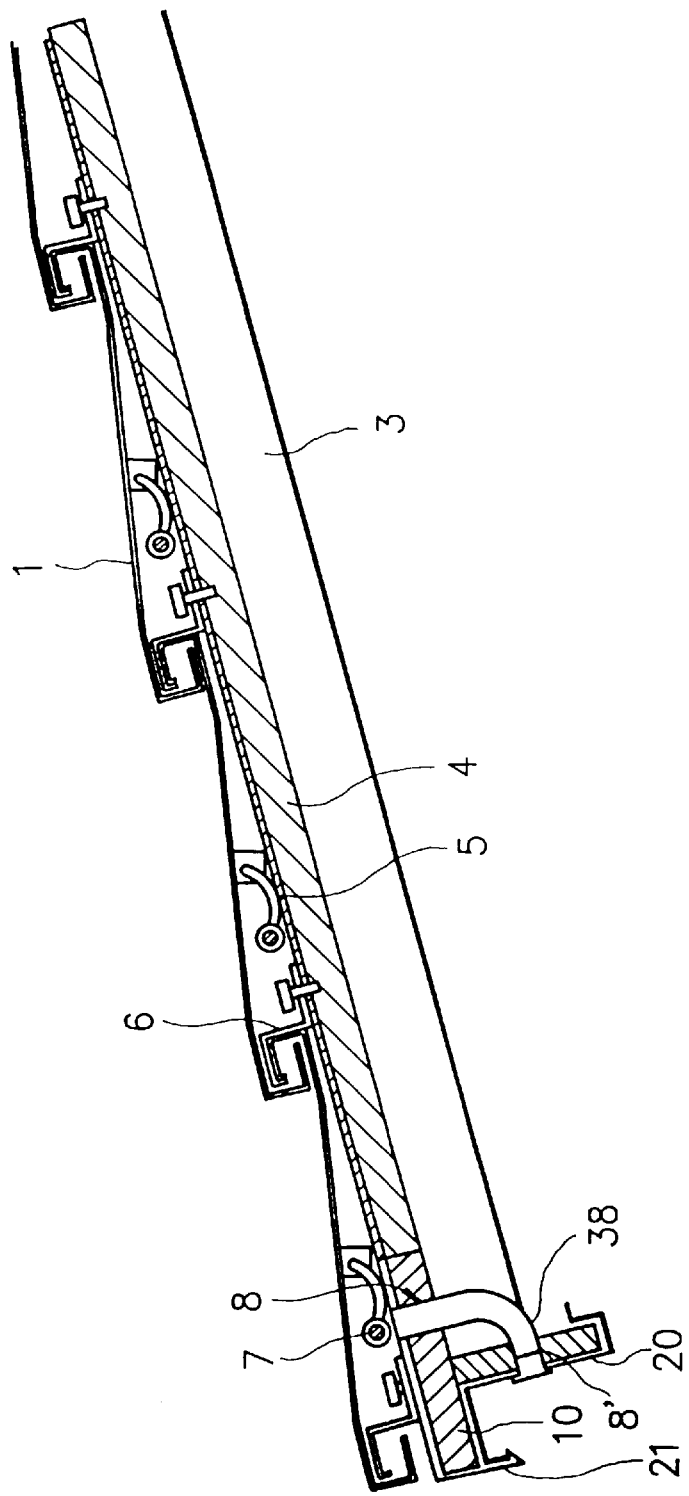
FIG. 10 is a schematic cross-sectional view illustrating an eaves portion of a solar cell-bearing roof in a fifth example of the present invention.

This example indicates a hip roof whose eaves covering member provides a throughhole as the wire-drawing means. FIG. 10 is a schematic cross-sectional view of an eaves portion of said hip roof.

In FIG. 10, reference numeral 21 indicates an eaves edge palmette, and reference numeral 38 a vinyl pipe. In FIG. 10, the constituents which are the same as those in FIGS. 5(A) and 8 are added with the same reference numerals as in FIGS. 5(A) and 8. Explanation of these constituents is omitted.

In this example, at the eaves portion, the wide lath 10 and the fascia board 20 are provided. The throughhole 8 if formed at the wide lath 10, and another throughhole 8' is formed at the fascia board 20. And these throughholes 8 and 8' are communicated by a vinyl pipe 38 to establish a wire-drawing means. A plurality of solar cell modules 1 are arranged such that they are electrically connected with each other in series connection by means of the wiring material 7 comprising a cable. The wiring material 7 is drawn to the outside through the vinyl pipe 38 and it is electrically connected to the inverter. Here, for the solar cell modules integrated in series connection, their peripheral conductive portions are electrically connected with each other through the clips 6 and an earthing steel belt (not shown) as well as in Example 3.

An earthing wire (not shown) is electrically connected to the earthing steel plate, drawn through the vinyl pipe 38, and electrically grounded.

In this example, the vinyl pipe 38 also serves to discharge water to the outside when water is generated on the roof face due to leakage of rain from joint portions of the roofing members, dew condensation on the roof face or the like. For this, the contacted portion of the underlayment comprising a waterproof building paper with the vinyl pipe is sealed by means of a sealant or the like.

In the embodiment of this example, no throughhole as the wire-drawing means is provided at the waterproof face and because of this, the reliability of the waterproof ability is improved. And the electric wiring can be drawn to the outside at the lowest position of the roof face of the building. This situation makes execution of work to be more easy.

EXAMPLE 6

This example indicates a shed roof whose ridge covering member is provided with a wire-drawing means.

FIG. 11 is a schematic cross-sectional view of a ridge portion of said shed roof. In FIG. 11, each of reference numerals 35 and 57 indicates a ridge covering board. At the ridge covering board 57, a throughhole 8 is provided. A vinyl pipe 36 and an elbow 37 are inserted into the throughhole 8. Under the ridge covering board 35, there is provided a cable wiring passage 55 so as to communicate with the vinyl pipe 36. In FIG. 11, the constituents which are the same as those in FIGS. 5(A) and 8 are added with the same reference numerals as in FIGS. 5(A) and 8. Explanation of these constituents is omitted.

In this example, as shown in FIG. 11, on the sheathing roof board 4 comprising a cemented excelsior board, a plurality of solar cell modules 1 are arranged while being fixed by means of the clips 6. The solar cell modules 1 are integrated in series connection by electrically connecting them with each other by means of the wiring material comprising a cable.

The wiring material is passed through the cable wiring passage 55, drawn to the outside through the vinyl pipe 36 and the elbow 37 inserted into the throughhole 8, and electrically connected to the inverter. The vinyl pipe 36 and the elbow 37 are provided for the purpose of preventing rain from invading into the inside of the roof.

Here, for the solar cell modules 1 integrated in series connection, their peripheral conductive portions are electrically connected with each other through the clips 6 and an earthing steel belt (not shown) as well as in Example 3. To this earthing steel belt, an earthing wire (not shown) is electrically connected. The earthing wire is drawn to the outside through the vinyl pipe 36 and the elbow 37 and it is electrically grounded.

In the embodiment of this example, no throughhole as the wire-drawing means is provided at the waterproof face and because of this, the reliability of the waterproof ability is improved.

EXAMPLE 7

Figure 12A:
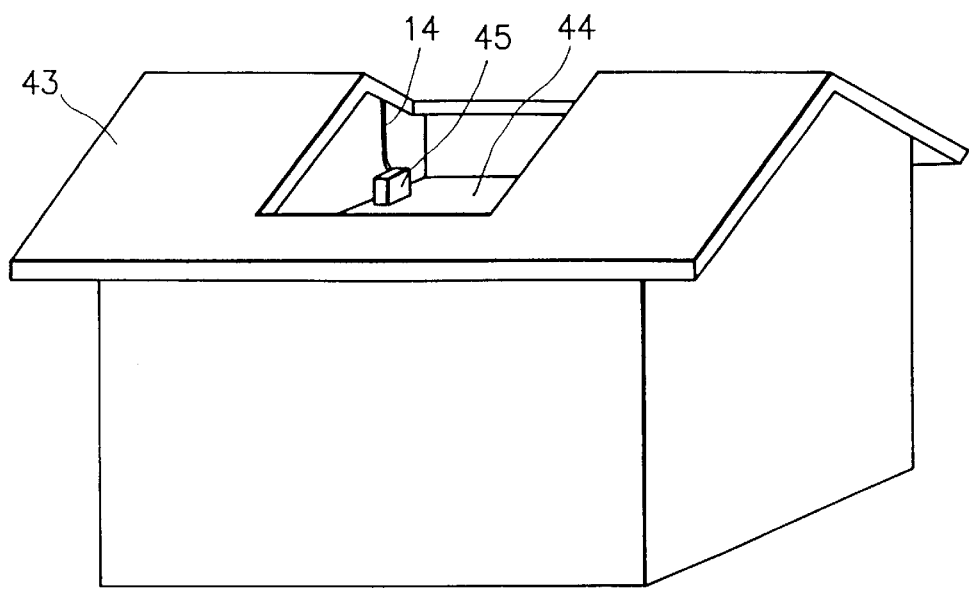
FIG. 12(A) is a schematic slant view illustrating a solar cell-bearing roof in a seventh example of the present invention.
Figure 12B:
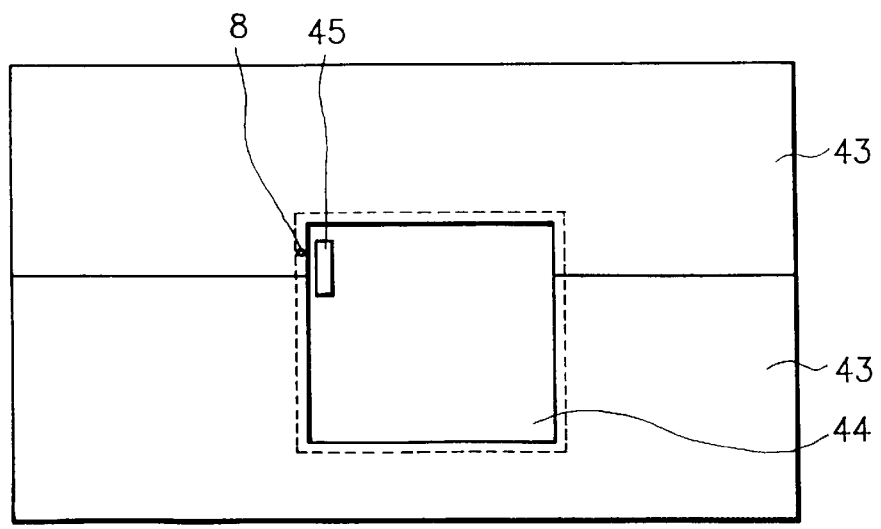
FIG. 12(B) is a schematic roof plan of the solar cell-bearing roof shown in FIG. 12(A).

This example indicates an example in which a solar cell module is installed in a roof form having a gradient roof 43 where a flat roof 44 for receiving natural illumination or utilizing as a roof top garden is provided as shown in FIGS. 12(A) and 12(B). FIG. 12(A) is a schematic explanatory view of said roof form, and FIG. 12(B) is a schematic roof plan view of said roof form. In the gradient roof 43, a plurality of solar cell modules are integrated in series connection by electrically connecting them with each other as in Example 1 (this is not shown). In FIGS. 12(A) and 12(B), reference numeral 14 indicates the foregoing power output wiring material (comprising a cable) extending from the integrated solar cell modules provided in the gradient roof 43, and reference numeral 45 an inverter provided on the flat roof 44. The wiring material 14 is electrically connected to the inverter 45.

The constitution in this example is the same as that in Example 4, except that the wire-drawing means comprising the throughhole 8 is provided in the verge portion on the flat roof face side. Particularly, the wiring material 14 is passed through the throughhole 8 and it is electrically connected to the inverter 45.

In this example, it is possible for the inverter 45 to be provided on the surrounding wall of the flat roof 44.

In the embodiment of this example, the wiring length can be shortened and because of this, the reliability is improved and the wiring loss is desirably small. And the electric power generated by the solar cells can be effectively utilized. This situation meets the object of the present invention.

EXAMPLE 8

Figure 13:
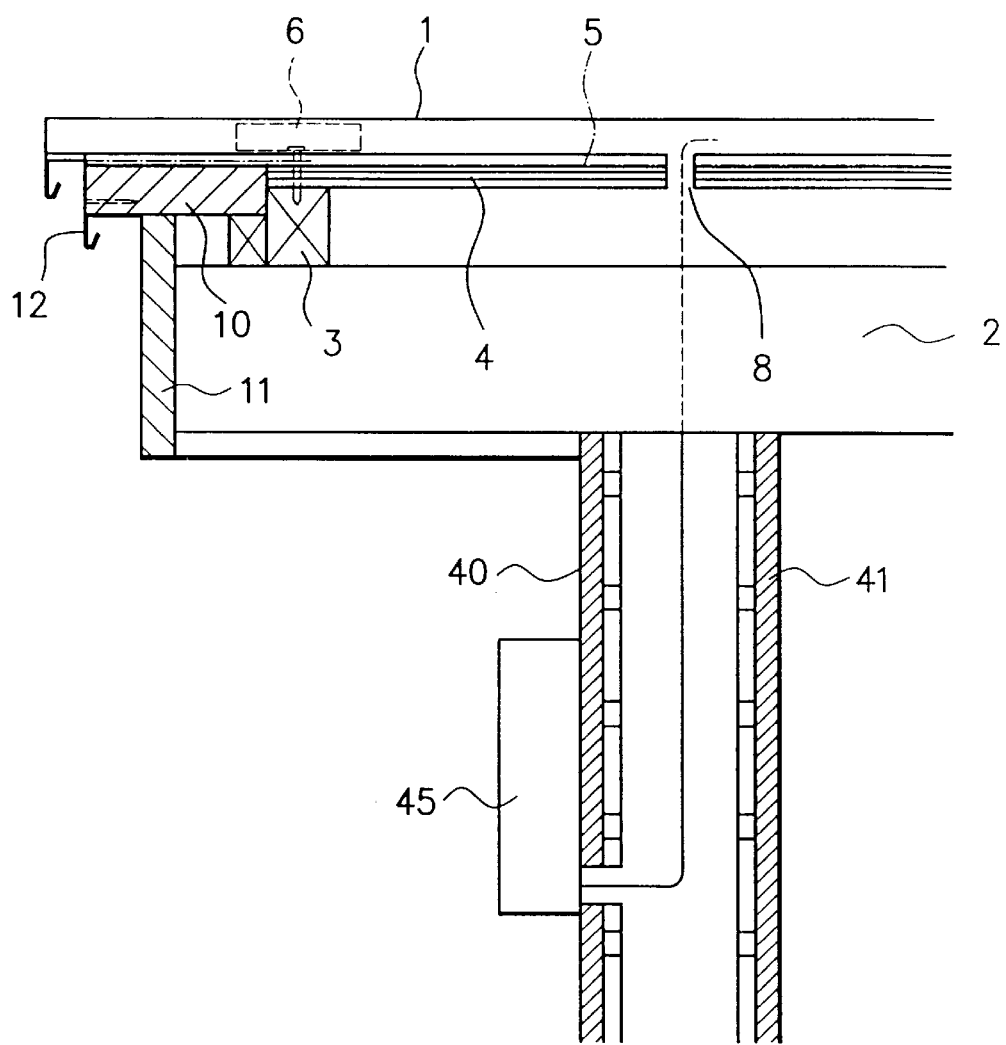
FIG. 13 is a schematic cross-sectional view illustrating an eaves portion of a solar cell-bearing roof in an eighth example of the present invention.

This example indicates a roof configuration shown in FIG. 13 which is corresponding to a modification of the configuration shown in FIGS. 2(B) and 2(C). In this example, an asphalt roofing felt as the underlayment is laid on the sheathing roof board provided on a roof face shaped in a hip roof form as shown in FIG. 7, a plurality of solar cell modules 1 each comprising an amorphous silicon solar cell sealed therein are laterally arranged on the asphalt roofing felt while being electrically connected with each other in series connection by means of the clips, and the throughhole 8 as the wire-drawing means is formed at a portion of the roof face situated above a wall structural body of the building.

FIG. 13 is a schematic cross-sectional view of said configuration.

In FIG. 13, the constituents which are the same as those in FIGS. 2(B) and 2(C) are added with the same reference numerals as in FIGS. 2(B) and 2(C). Explanation of these constituents is omitted. In FIG. 13, reference numeral 40 indicates an outer wall face of the wall structural body, reference numeral 41 an inner wall face of the wall structural body, and reference numeral 45 a device comprising a connection box and an inverter.

Particularly, in this example, as shown in FIG. 13, another throughhole as the wire-drawing means is formed at a lower position of the outer wall face 40, the device 45 comprising the connection box and the inverter is provided on the outer wall face 40 where said another throughhole is formed, and the wiring material (comprising a cable) extending from the integrated solar cell modules is drawn through the throughhole 8 into the space of the wall structural body between the outer wall face 40 and the inner wall face 41, extended in said space, passed through the throughhole of the outer wall face 40 and electrically connected to the connection box and the inverter of the device 45.

In the configuration of this example, the electric wiring including the wiring material is never exposed, the length of the electric wiring from the solar cell-bearing roof is desirably short, and there can be attained a sunlight power generation apparatus which is slight in wiring loss.

Figure 14:
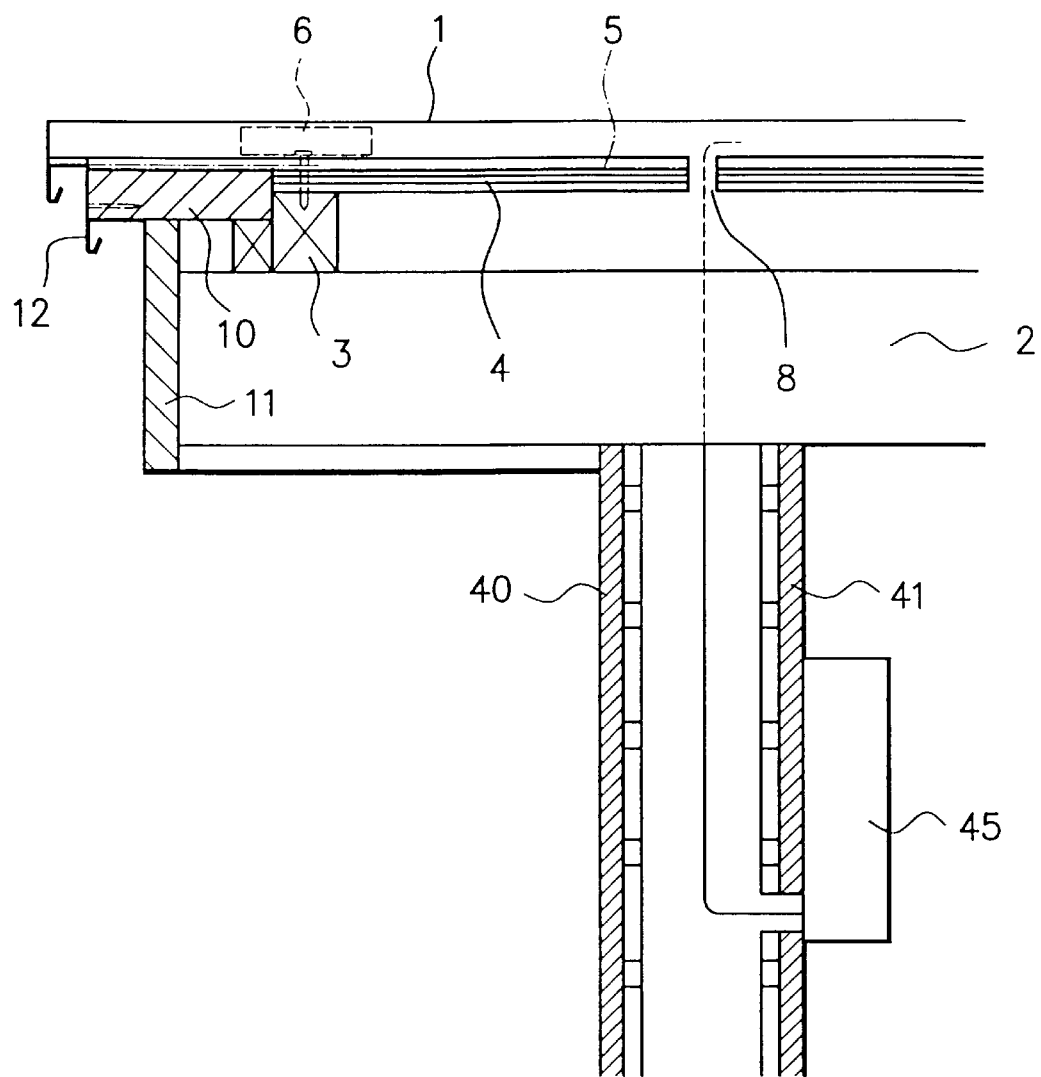
FIG. 14 is a schematic cross-sectional view illustrating a modification of the solar cell-bearing roof in the eighth example of the present invention.

It is possible for the device 45 comprising the connection box and the inverter to be provided on the inner wall face 41 on the indoor side as shown in FIG. 14. The configuration shown in FIG. 14 is the same as that shown in FIG. 13, except that the device 45 is provided on the inner wall face 41.

EXAMPLE 9

Figure 16:
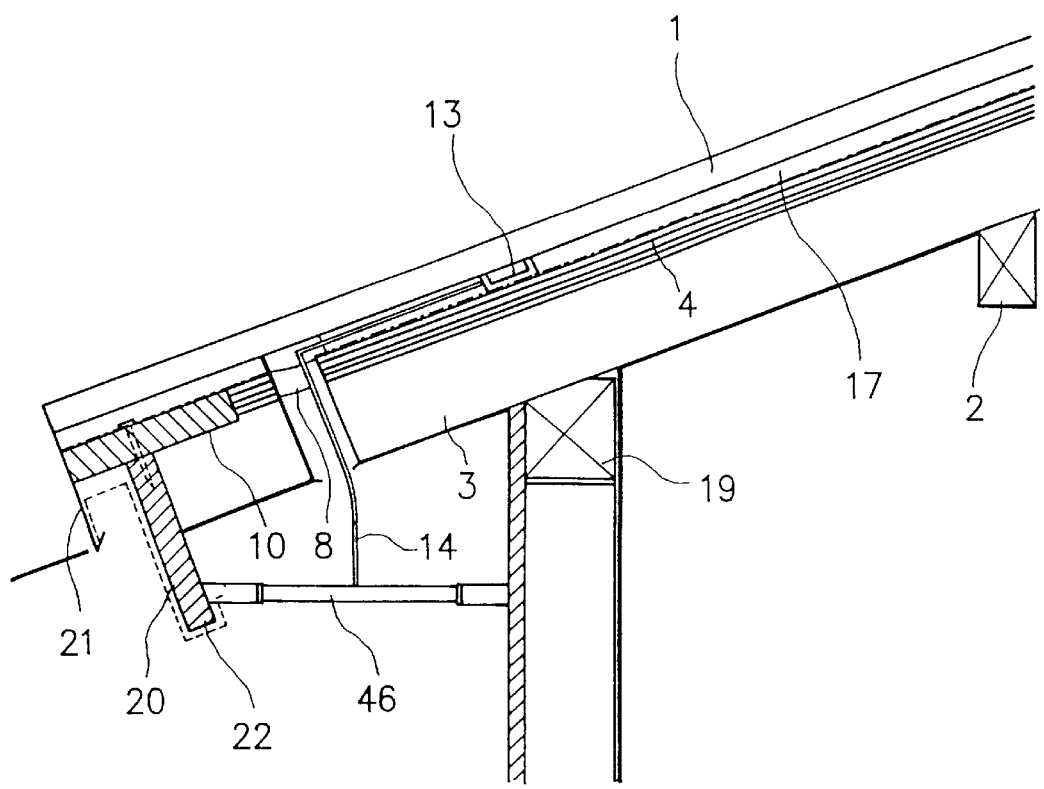
FIG. 16 is a schematic cross-sectional view illustrating an eaves portion of the solar cell-bearing roof in the ninth example of the present invention.

This example indicates a roof configuration shown in FIG. 16 which is corresponding to a modification of the embodiment shown in FIGS. 5(A) and 5(B). Particularly, in this example, an asphalt roofing felt as the underlaymennt is laid on the sheathing roof board provided on a gable-shaped roof face, a batten seam roofing solar cell module 1 (see, FIG. 16) is provided on said asphalt roofing felt, and the wire-drawing means for the wiring material of the solar cell module is provided at an edge of the eaves, wherein said solar cell module comprises a plurality of solar cell modules each comprising an amorphous silicon solar cell sealed therein.

Figure 15:
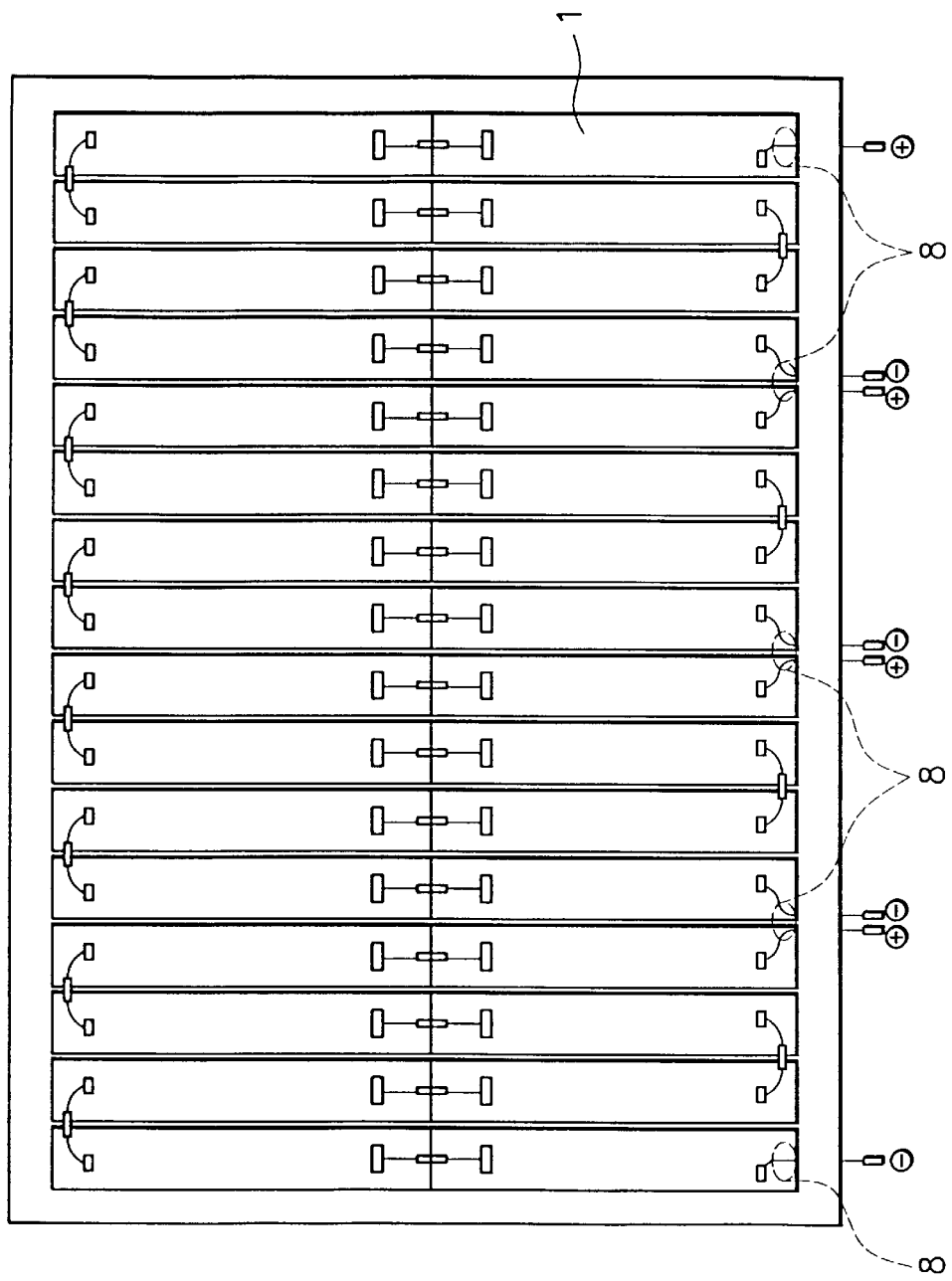
FIG. 15 is a schematic view illustrating an electrically connected state in a rear side of a solar cell-bearing roof in a ninth example of the present invention.

FIG. 15 is a schematic view illustrating an electrically connected state in the rear side of said batten seam roofing solar cell module. The batten seam roofing solar cell module 1 comprises four strings each comprising eight batten seam roofing solar cell modules electrically connected with each other in series connection, where said four strings are arranged in parallel. The number of the solar cell modules which can be thatched in the slope direction is 2 because of the area of the roof in this example. And the positive and negative power output terminals of the strings are provided on the eaves edge side. In this constitution, there are provided five throughholes 8 as the wire-drawing means respectively at a position to which the positive and negative connectors of the string reach.

FIG. 16 is a schematic cross-sectional view of an eaves portion of the roof configuration in this example. In FIG. 16, the constituents which are the same as those in FIG. 5(A) are added with the same reference numerals as in FIG. 5(A). Explanation of these constituents is omitted.

In this example, as shown in FIG. 16, at the eaves soffit, a checking means 46 is provided under the throughhole 8 as the wire-drawing means. In the checking means 46, the wiring material extending from the solar cell module and which is drawn through the throughhole 8 is connected to the connection box and the like by means of a connector (not shown) as shown in FIG. 16.

In this example, the roofing work can be conducted separately from the electric work, and because of this, the installation structure in this example is good in terms of execution of work.

In this example, the checking means is provided under the eaves in the case of the batten seam roofing as above described. In the case of a lateral roofing, such checking means can be provided on the gable end side.

EXAMPLE 10

Figure 17:
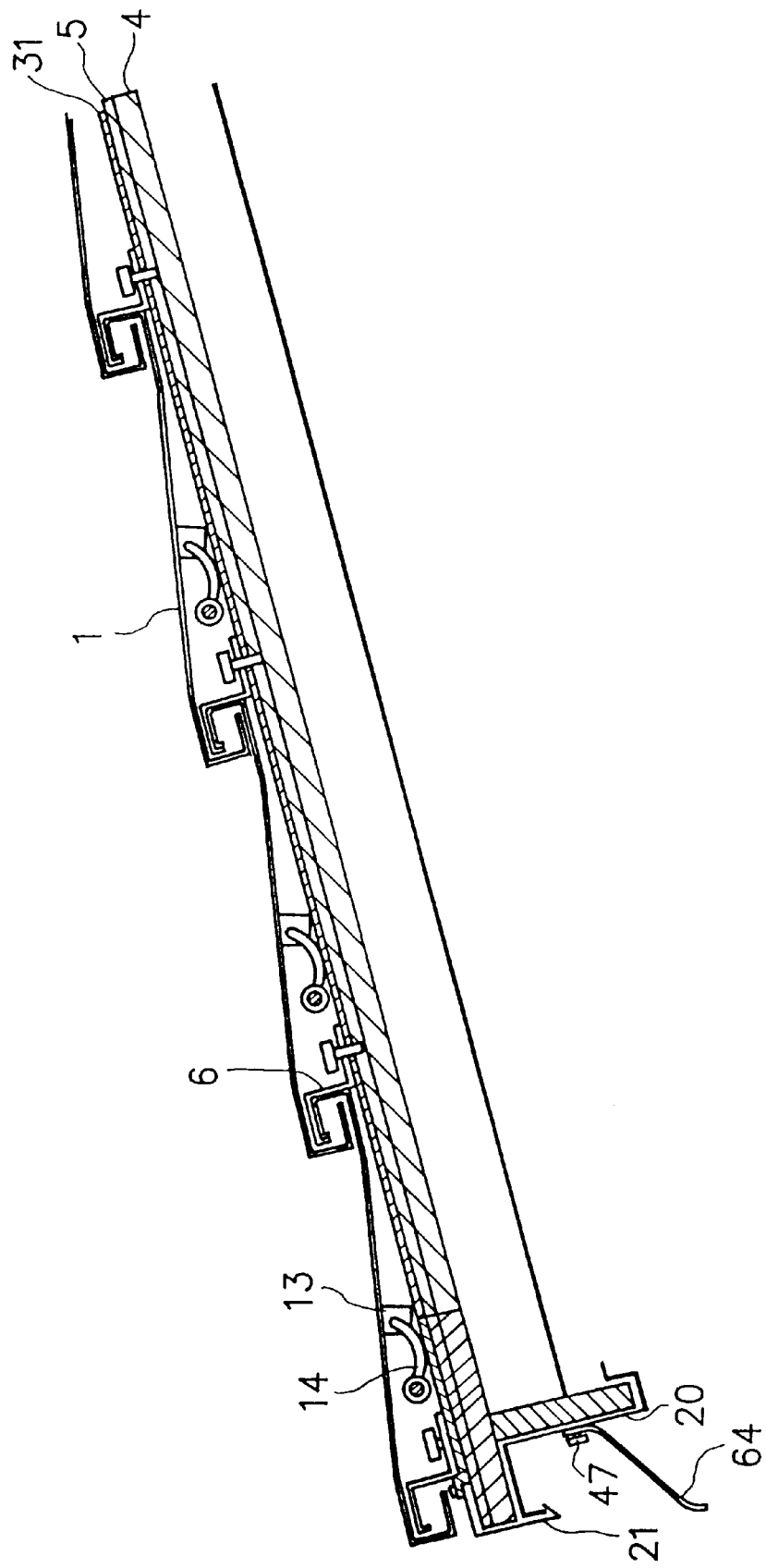
FIG. 17 is a schematic cross-sectional view illustrating an eaves portion of a solar cell-bearing roof in a tenth example of the present invention.

This example indicates a roof configuration (having a plurality of solar cell modules electrically connected in series connection through their peripheral conductive materials) shown in FIG. 17 which is corresponding to a modification of the embodiment shown in FIG. 8. Particularly, in this example, when an end portion of the roof having an accommodating member comprising a metallic material is electrically connected with the electrically connected peripheral conductive materials of the solar cell modules, the wire-drawing means for drawing an earthing wire from the solar cell modules to the outside is provided at an earthing member made of a metal.

FIG. 17 is a schematic cross-sectional view of an eaves portion of the roof configuration in this example.

In FIG. 17, the constituents which are the same as those in FIG. 8 are added with the same reference numerals as in FIG. 8. Explanation of these constituents is omitted.

In this example, as shown in FIG. 17, the peripheral conductive materials of the solar cell modules 1 are electrically connected with each other by means of an earthing steel belt 31. And when each of the fascia board 20 and the eaves edge palmett 21 as the accommodating member of the eaves edge is composed of a metallic material, the earthing steel belt 31 is electrically connected to these fascia board and eaves edge palmett, and an earthing wire 64 is fixed by means of a screw 47 through these fascia board and eaves palmett and the earthing wire is electrically connected to an earthing bar (not shown) embedded in the ground.

In this example, the earthing work can be readily conducted and the execution of work is good.

What is claimed is:

1. A solar cell-bearing roof comprising:
   a roof base member provided on a partition wall which partitions a building into an indoor portion and an outdoor portion, said partition wall having an inner face on a side of said indoor portion and an outer face on a side of said outdoor portion;
   a solar cell module provided on a front face of said roof base member; and
   electric wiring having a first end portion electrically connected with said solar cell module, wherein said electric wiring connected to said solar cell module extends through said roof base member such that a second end portion of said electric wiring reaches a desired position on a back face of said roof base member which has no solar cell module thereon, said position being situated in an area of the back face on said outdoor portion side and which is outside said inner face of said partition wall.

2. A solar cell-bearing roof according to claim 1, wherein said roof base member includes a throughhole at a portion thereof on said outdoor portion side and which is outside said inner face of the partition wall, and the electric wiring is drawn through the throughhole such that a second end of said electric wiring reaches said position.

3. A solar cell-bearing roof according to claim 1, wherein said roof base member comprises a sheathing roof board.

4. A solar cell-bearing roof according to claim 1, further comprising a roof accommodating member provided at an end portion of said roof base member, wherein said second end portion of said electric wiring is drawn to the outside through wire-drawing means provided at said roof accommodating member.

5. A solar cell-bearing roof according to claim 4, wherein said roof accommodating member comprises a wide lath having a throughhole, wherein said electric wiring is drawn to the outside through said throughhole.

6. A solar cell-bearing roof according to claim 4, wherein said roof accommodating member comprises a wide lath having a first throughhole, a fascia board having a second throughhole, and a pipe for communicating the first throughhole and the second throughhole, wherein said second end portion of said electric wiring is drawn to the outside through said pipe.

7. A solar cell-bearing roof according to claim 1, wherein said roof base member comprises a shed roof having a ridge accommodating member, said ridge accommodating member having a throughhole, wherein said second end portion of said electric wiring is drawn to the outside through the throughhole.

8. A solar cell-bearing roof according to claim 1, wherein said electric wiring comprises a power output wiring for outputting electric power generated by said solar cell module.

9. A solar cell-bearing roof according to claim 1, wherein said solar cell module has a peripheral conductive material and said electric wiring includes an earthing wire for earthing said peripheral conductive material.

10. A solar cell-bearing roof according to claim 1, further comprising a conductive roof accommodating member provided at an end portion of said roof base member, said solar cell module having a peripheral conductive material, wherein said electric wiring electrically connects said peripheral conductive material, and said conductive roof accommodating member is electrically grounded by means of an earthing wire.

11. A method for installing a solar cell-bearing roof, comprising the steps of:
(a) providing a solar cell module on a roof base member provided on a partition wall of a building, the partition wall partitioning the building, into an indoor portion and an outdoor portion and the partition wall having an inner face on a side of the indoor portion and an outer face on a side of the outdoor portion;
(b) electrically connecting a first end portion of an electric wiring with the solar cell module between the roof base member and the solar cell module; and
(c) drawing the electric wiring connected to the solar cell module through the roof base member such that a second end portion of the electric wiring reaches a position on a back face of the roof base member which has no solar cell module thereon, the position being situated in an area of the back face on the outdoor portion side and which is outside the inner face of said partition wall.

12. A method according to claim 11, further comprising the step of forming a throughhole at a portion of the roof base member on the outdoor portion side and which is outside the inner face of the partition wall, wherein in the drawing step, the second end portion of the electric wiring is drawn through the throughhole.

13. A method according to claim 11, wherein the roof base member comprises a sheathing roof board.

14. A method according to claim 11, further comprising the step of providing a roof accommodating member with wire-drawing means at a roof end portion of the building, wherein in the drawing step, the second end portion of the electric wiring is drawn through the wire-drawing means of the roof accommodating member.

15. A method according to claim 14, wherein the roof accommodating member comprises a wide lath, a throughhole is formed at the wide lath, wherein in the drawing step, the electric wiring is drawn through the throughhole.

16. A method according to claim 14, wherein the roof accommodating member comprises a wide lath, a throughhole is formed at the wide lath, wherein in the drawing step, the electric wiring is drawn through the throughhole.

17. A method according to claim 11, wherein the solar cell-baring roof comprises a shed roof having a ridge accommodating member, a throughhole is formed at the ridge accommodating member, wherein in the drawing step, the second end portion of the electric wiring is drawn through the throughhole.

18. A method according to claim 11, wherein the electric wiring comprises a power output wiring for outputting an electric power generated by the solar cell module.

19. A method according to claim 11, wherein the solar cell module has a peripheral conductive material and the electric wiring includes an earthing wire for earthing the peripheral conductive material.

20. A method according to claim 11, wherein the solar cell module has a peripheral conductive material, a conductive roof accommodating member is formed at an end portion of the roof base member, and the drawing step comprises the steps of electrically connecting the peripheral conductive material and the conductive roof accommodating member by the electric wiring and electrically grounding the conductive roof accommodating member by means of an earthing wire.

21. A power generation system, comprising:
a solar cell-bearing roof including a solar cell module which is provided on a front face of a roof base member provided on a partition wall of a building, said partition wall partitioning the building into an indoor portion and an outdoor portion and said partition wall having an inner face on a side of said indoor portion and an outer face on a side of said outdoor portion;
electric wiring with a first end portion being electrically connected to said solar cell module between said roof base member and said solar cell module; and
an inverter electrically connected to said electric wiring, wherein said electric wiring connected to said solar cell module extends through said roof base member such that a second end portion of said electric wiring reaches a desired position on a back face of said roof base member which has no solar cell module thereon, said position being situated in an area of said back face on the outdoor portion side and which is outside said inner face of said partition wall, and said electric wiring is electrically connected to said inverter through said second end portion of said electric wiring.

22. A power generation system according to claim 21, wherein said roof base member has a throughhole at a portion thereof on said outdoor portion side which is outside said inner face of said partition wall, and said electric wiring is drawn through said throughhole such that the second end portion of said electric wiring reaches said position.

23. A power generation system according to claim 21, wherein said roof base member comprises a sheathing roof board.

24. A power generation system according to claim 21, further comprising a roof accommodating member provided at an end portion of said roof base member, wherein said second end portion of said electric wiring is drawn to the outside through wire-drawing means provided at said roof accommodating member.

25. A power generation system according to claim 24, wherein said roof accommodating member comprises a wide lath having a throughhole, wherein said second end portion of said electric wiring is drawn to the outside through the throughhole.

26. A power generation system according to claim 24, Wherein said roof accommodating member comprises a wide lath having a first throughhole, a fascia board having a second throughhole, and a pipe for communicating the first throughhole and the second throughhole, wherein said second end portion of said electric wiring is drawn to the outside through said pipe.

27. A power generation system according to claim 21, wherein said solar cell-baring roof comprises a shed roof having a ridge accommodating member, said ridge accommodating member having a throughhole, wherein said second end portion of said electric wiring is drawn to the outside through the throughhole.

28. A power generation system according to claim 21, wherein said electric wiring comprises a power output wiring for outputting an electric power generated by said solar cell module.

29. A power generation system according to claim 21, wherein said solar cell module has a peripheral conductive material and said electric wiring includes an earthing wire for earthing said peripheral conductive material.

30. A power generation system according to claim 21, further comprising a conductive roof accommodating member provided at an end portion of said solar cell module having a peripheral conductive material, wherein said electric wiring electrically connects said peripheral conductive material and said conductive roof accommodating member, and said conductive roof accommodating member is electrically grounded by means of an earthing wire.

31. A building provided with a solar cell-bearing roof, comprising:
   a partition wall which partitions the building into an indoor portion and an outdoor portion, said partition wall having an inner face on a side of said indoor portion and an outer face on a side of said outdoor portion;
   a roof base member provided on said partition wall;
   a solar cell module provided on said roof base member; and
   electric wiring having a first end portion electrically connected with said solar cell module, wherein said electric wiring connected to said solar cell module extends through said roof base member such that a second end portion of said electric wiring reaches a desired position on a back face of said roof base member which has no solar cell module thereon, said portion being situated in an area of said back face on the outdoor portion side and which is outside said inner face of said partition wall.

32. A building according to claim 31, wherein said roof base member has a throughhole at a portion thereof on said outdoor portion side and which is outside said inner wall of said partition wall, and said electric wiring is drawn through the throughhole such that said second end portion of said electric wiring reaches said position.

33. A building according to claim 31, wherein said roof base member comprises a sheathing roof board.

34. A building according to claim 31, further comprising a roof accommodating member provided at an end portion of said roof, wherein said second end portion of said electric wiring is drawn to the outside through wire-drawing means provided at said roof accommodating member.

35. A building according to claim 34, wherein said roof accommodating member comprises a wide lath having a throughhole, wherein said second end portion of said electric wiring is drawn to the outside through the throughhole.

36. A building according to claim 34, wherein said roof accommodating member comprises a wide lath having a first throughhole, a fascia board having a second throughhole, and a pipe for communicating the first throughhole and the second throughhole, wherein said second end portion of said electric wiring is drawing to the outside through said pipe.

37. A building according to claim 31, wherein said solar cell-bearing roof comprises a shed roof having a ridge accommodating member, said ridge accommodating member having a throughhole, wherein said second end portion of said electric wiring is drawn to the outside through the throughhole.

38. A building according to claim 31, wherein said electric wiring comprises a power output wiring for outputting an electric power generated by said solar cell module.

39. A building according to claim 31, wherein said solar cell module has a peripheral conductive material and said electric wiring includes an earthing wire for earthing said peripheral conductive material.

40. A building according to claim 31, further comprising a conductive roof accommodating member provided at an end portion of said solar cell-bearing roof, said solar cell module having a peripheral conductive material, wherein said electric wiring electrically connected said peripheral conductive material and said conductive roof accommodating member, and said conductive roof accommodating member is electrically grounded by means of an earthing wire.

41. A solar cell-bearing roof according to claim 1, further comprising a plurality of spacers disposed between said roof base member and said solar cell module.

42. A solar cell-bearing roof according to claim 1, wherein said solar cell module includes a plurality of amorphous silicon solar cells.

43. A solar cell-bearing roof according to claim 42, wherein said silicon solar cells are electrically connected in series.

44. A solar cell-bearing roof according to claim 1, further comprising a plurality of partition walls forming an exterior portion within a perimeter of said roof base member.

45. A solar cell-bearing roof according to claim 44, wherein the second end portion of said electric wiring reaches a position on the back face of said roof base member, with said position situated on the exterior portion side of said partition wall.

46. A solar cell-bearing roof comprising:
   a roof base member provided on a partition wall which partitions a building into an indoor portion and an outdoor portion, said partition wall having an inner face on a side of said indoor portion and an outer face on a side of said outdoor portion;
   a solar cell module provided on a front face of said roof base member; and
   electric wiring having a first end portion electrically connected with said solar cell module, wherein said electric wiring connected to said solar cell module extends through said roof base member such that a second end portion of said electric wiring reaches a desired position on a back face of said roof base member which has no solar cell module thereon, said position being situated in an area of the back face which is between said inner face and said outer face of said partition wall.

47. A solar cell-bearing roof according to claim 46, wherein the second end portion of said electric wire terminates at said outer face of said partition wall.

48. A solar cell-bearing roof according to claim 46, wherein the second end portion of said electric wire terminates at said inner face of said partition wall.

49. A solar cell-bearing roof according to claim 47, wherein said electric wiring comprises a power output wiring for outputting electric power generated by said solar cell module.

50. A solar cell-bearing roof according to claim 48, wherein said electric wiring comprises a power output wiring for outputting electric power generated by said solar cell module.

51. A solar cell-bearing roof according to claim 47, wherein said solar cell module has a peripheral conductive material and said electric wiring includes an earthing wire for earthing said peripheral conductive material.

52. A solar cell-bearing roof according to claim 48, wherein said solar cell module has a peripheral conductive material and said electric wiring includes an earthing wire for earthing said peripheral conductive material.

53. A solar cell-hearing roof according to claim 47, further comprising a conductive roof accommodating member provided at an end portion of said roof base member, said solar cell module having a peripheral conductive material, wherein said electric wiring electrically connects said peripheral conductive material and said conductive roof accommodating member, and said conductive roof accommodating member is electrically grounded by means of an earthing wire.

54. A solar cell-bearing roof according to claim 48, further comprising a conductive roof accommodating member provided at an end portion of said roof base member, said solar cell module having a peripheral conductive material, wherein said electric wiring electrically connects said peripheral conductive material and said conductive roof accommodating member, aid said conductive roof accommodating member is electrically grounded by means of an earthing wire.

55. A method according to claim 11, further comprising the step of providing a plurality of spacers between the roof base member and the solar cell module.

56. A method according to claim 11, wherein the solar cell module includes a plurality of amorphous silicon solar cells.

57. A method according to claim 56, further comprising the step of electrically connecting the silicon solar cells in series.

58. A method according to claim 11, further comprising the step of providing a plurality of partition walls forming an exterior portion within a perimeter of the roof base member.

59. A method according to claim 58, wherein the second end portion of the electric wiring reaches a position on the back face of the roof base member, with the position situated on the exterior portion side of the partition wall.

60. A power generation system according to claim 21, further comprising a plurality of spacers between said roof base member and said solar cell module.

61. A power generation system according to claim 21, wherein said solar cell module includes a plurality of amorphous silicon solar cells.

62. A power generation system according to claim 61, wherein said silicon solar cells are electrically connected in series.

63. A power generation system according to claim 21, further comprising a plurality of partition walls forming an exterior portion within a perimeter of said roof base member.

64. A power generation system according to claim 63, wherein the second end portion of said electric wiring reaches a position on the back face of said roof base member, with said position situated on the exterior portion side of said partition wall.

65. A building according to claim 31, further comprising a plurality of spacers disposed between said roof base member and said solar cell module.

66. A building according to claim 31, wherein said solar cell module includes a plurality of amorphous silicon solar cells.

67. A building according to claim 66, wherein said silicon solar cells are electrically connected in series.

68. A solar cell-bearing roof according to claim 31, further comprising a plurality of partition walls forming an exterior portion within a perimeter of said roof base member.

69. A solar cell-bearing roof according to claim 68, wherein the second end portion of said electric wiring reaches a position on the back face of said roof base member, with said position situated on the exterior portion side of said partition wall.

70. A method for installing a solar cell-bearing roof, comprising the steps of:
   (a) providing a solar cell module on a roof base member provided on a partition wall of a building, the partition wall partitioning the building into an indoor portion and an outdoor portion and the partition wall having an inner face on a side of the indoor portion and an outer face on a side of the outdoor portion;
   (b) electrically connecting a first end portion of an electric wiring with the solar cell module between the roof base member and the solar cell module; and
   (c) drawing the electric wiring connected to the solar cell module through the roof base member such that a second end portion of the electric wiring reaches a position on a back face of the roof base member which has no solar cell module thereon, the position being situated in an area of the back face on the outdoor portion side and which is between the inner face and the outer face of the partition wall.

71. A method according to claim 70, wherein the second end portion of the electric wire terminates at the outer face of the partition wall.

72. A method according to claim 71, wherein the second end portion of the electric wire terminates at the inner face of the partition wall.

73. A method according to claim 71, wherein the electric wiring comprises a power output wiring for outputting electric power generated by the solar cell module.

74. A method according to claim 72, wherein the electric wiring comprises a power output wiring for outputting electric power generated by the solar cell module.

75. A method according to claim 71, wherein the solar cell module has a peripheral conductive material and the electric wiring includes an earthing wire for earthing the peripheral conductive material.

76. A method according to claim 72, wherein the solar cell module has a peripheral conductive material and the electric wiring includes an earthing wire for earthing the peripheral conductive material.

77. A method according to claim 71, further comprising a conductive roof accommodating member provided at an end portion of the roof base member, the solar cell module having a peripheral conductive material, wherein the electric wiring electrically connects the peripheral conductive material and the conductive roof accommodating member, and the conductive roof accommodating member is electrically grounded by means of an earthing wire.

78. A method according to claim 72, further comprising a conductive roof accommodating member provided at an end portion of the roof base member, the solar cell module having a peripheral conductive material, wherein the electric wiring electrically connects the peripheral conductive material and the conductive roof accommodating member, and the conductive roof accommodating member is electrically grounded by means of an earthing wire.

79. A power generation system, comprising: a solar cell-bearing roof including a solar cell module which is provided on a front face of a roof base member provided on a partition wall of a building, said partition wall partitioning the building into an indoor portion and an outdoor portion and said partition wall having an inner face on a side of said indoor portion and an outer face on a side of said outdoor portion; electric wiring with a first end portion being electrically connected to said solar cell module between said roof base member and said solar cell module; and an inverter electrically connected to said electric wiring, wherein said electric wiring connected to said solar cell module extends through said roof base member such that a second end portion of said electric wiring reaches a desired position on a back face of said roof base member which has no solar cell module thereon, said position being situated in an area of said back face on the outdoor portion side and which is between said inner face and said outer face of said partition wall, and said electric wiring is electrically connected to said inverter through said second end portion of said electric wiring.

80. A power generation system according to claim 79, wherein the second end portion of said electric wire terminates at said outer face of said partition wall.

81. A power generation system according to claim 79, wherein the second end portion of said electric wire terminates at said inner face of said partition wall.

82. A power generation system according to claim 80, wherein said electric wiring comprises a power output wiring for outputting electric power generated by said solar cell module.

83. A power generation system according to claim 81, wherein said electric wiring comprises a power output wiring for outputting electric power generated by said solar cell module.

84. A power generation system according to claim 80, wherein said solar cell module has a peripheral conductive material and said electric wiring includes an earthing wire for earthing said peripheral conductive material.

85. A power generation system according to claim 81, wherein said solar cell module has a peripheral conductive material and said electric wiring includes an earthing wire for earthing said peripheral conductive material.

86. A power generation system according to claim 80, further comprising a conductive roof accommodating member provided at an end portion of said roof base member, said solar cell module having a peripheral conductive material, wherein said electric wiring electrically connects said peripheral conductive material and said conductive roof accommodating member, and said conductive roof accommodating member is electrically grounded by means of an earthing wire.

87. A power generation system according to claim 81, further comprising a conductive roof accommodating member provided at an end portion of said roof base member, said solar cell module having a peripheral conductive material, wherein said electric wiring electrically connects said peripheral conductive material and said conductive roof accommodating member, and said conductive roof accommodating member is electrically grounded by means of an earthing wire.

88. A building provided with a solar cell-bearing roof, comprising:
  a partition wall which partitions the building into an indoor portion and an outdoor portion, said partition wall having an inner face on a side of said indoor portion and an outer face on a side of said outdoor portion;
  a roof base member provided on said partition wall;
  a solar cell module provided on said roof base member; and
  electric wiring having a first end portion electrically connected with said solar cell module, wherein said electric wiring connected to said solar cell module extends through said roof base member such that a second end portion of said electric wiring reaches a desired position on a back face of said roof base member which has no solar cell module thereon, said position being situated in an area of said back face on the outdoor portion side and which is between said inner face and said outer face of said partition wall.

89. A building according to claim 88, wherein the second end portion of said electric wire terminates at said outer face of said partition wall.

90. A building according to claim 88, wherein the second end portion of said electric wire terminates at said inner face of said partition wall.

91. A building according to claim 89, wherein said electric wiring comprises a power output wiring for outputting electric power generated by said solar cell module.

92. A building according to claim 90, wherein said electric wiring comprises a power output wiring for outputting electric power generated by said solar cell module.

93. A building according to claim 89, wherein said solar cell module has a peripheral conductive material and said electric wiring includes an earthing wire for earthing said peripheral conductive material.

94. A building according to claim 90, wherein said solar cell module has a peripheral conductive material and said electric wiring includes an earthing wire for earthing said peripheral conductive material.

95. A building according to claim 89, further comprising a conductive roof accommodating member provided at an end portion of said roof base member, said solar cell module having a peripheral conductive material, wherein said electric wiring electrically connects said peripheral conductive material and said conductive roof accommodating member, and said conductive roof accommodating member is electrically grounded by means of an earthing wire.

96. A building according to claim 90, further comprising a conductive roof accommodating member provided at an end portion of said roof base member, said solar cell module having a peripheral conductive material, wherein said electric wiring electrically connects said peripheral conductive material and said conductive roof accommodating member, and said conductive roof accommodating member is electrically grounded by means of an earthing wire.

97. A solar cell-bearing roof according to claim 46, wherein said electric wiring comprises a power output wiring for outputting electric power generated by said solar cell module.

98. A solar cell-bearing roof according to claim 46, wherein said solar cell module has a peripheral conductive material and said electric wiring includes an earthing wire for earthing said peripheral conductive material.

99. A solar-cell bearing roof comprising:
  a roof base member provided on a partition wall which partitions a building into an indoor portion and an outdoor portion, said partition wall having an inner face on a side of said indoor portion and an outer face on a side of said outdoor portion;

a solar cell module provided on a front face of said roof base member; and electric wiring having a first end portion electrically connected with said solar cell module between said roof base member and said solar cell module;

wherein said electric wiring connected to said solar cell module extends through said roof base member such that said electric wiring passes through a wiring passage provided at a portion of said roof base member on a side of said outdoor portion.

100. A solar cell-bearing roof according to claim 99, wherein said wiring passage provided at said roof base member has a through-hole at a portion thereof on said outdoor portion side, and a second end portion of said electric wiring is drawn through the through-hole.

101. A solar coil-bearing roof according to claim 99, wherein said roof base member comprises a sheathing roof board.

102. A solar cell-bearing roof according to claim 101, wherein said sheathing roof board comprises a cemented excelsior board.

103. A solar cell-bearing roof according to claim 99, wherein a ridge covering member is provided over said wiring passage.

104. A solar cell-bearing roof according to claim 100, wherein a ridge coveting member is provided at said partition wall on said outdoor portion aide, and the through-hole is formed to penetrate said covering member.

105. A solar cell-bearing roof according to claim 102, wherein the through-hole comprises a pipe having an elbow inserted therein and said pipe is communicated with said wiring passage.

106. A solar cell-bearing roof according to claim 99, wherein said electric wiring comprises a power output wiring for outputting electric power generated by said solar cell module.

107. A solar cell-bearing roof according to claim 99, wherein said solar cell module has a peripheral conductive material and said electric wiring includes an earthing wire for earthing said peripheral conductive material.

108. A solar cell-bearing roof according to claim 99, wherein said solar cell module includes a plurality of solar cells.

109. A solar cell-bearing roof according to claim 108, wherein said solar cells are electrically connected m series.

110. A method for installing a solar coil-bearing roof, comprising the steps of:
(a) providing a solar cell module on a front face of a roof base member provided on a partition wall of a building, the partition wall partitioning the building into an indoor portion and a outdoor portion and the partition wall having an inner face on a side of the indoor portion and an outter face on a side of the outdoor portion;
(b) electrically connecting an electric wiring to the solar cell module through a first end portion of the electric wiring between the roof base member and the solar cell module; and
(c) drawing the electric wiring connected to the solar cell module through the roof base member such that the electric wiring passes through a wiring passage provided at a portion of the roof base member on a side of the outdoor portion.

111. A method according to claim 110, further comprising a step of forming a through-hole at a portion of the wiring passage provided at the roof base member on the outdoor portion side, wherein in the drawing step (c), the electric wiring is drawn through the through-hole.

112. A method according to claim 110, wherein the roof base member comprises a sheathing roof board.

113. A method according to claim 112, wherein the sheathing roof board comprises a cemented excelsior board.

114. A method according to claim 110, wherein a ridge covering member is provided over the wiring passage.

115. A method according to claim 110, wherein, ridge covering member is provided at the partition wall on the outdoor portion side and the through-hole is formed to penetrate the covering member.

116. A method according to claim 115, wherein the through-hole comprises a pipe having an elbow inserted therein and the pipe is communicated with the wiring passage.

117. A method according to claim 110, wherein the electric wiring comprises a power output wiring for outputting electric power generated by the solar cell module.

118. A method according to claim 110, wherein the solar cell module has a peripheral conductive material and the electric wiring includes an earthing wire for earthing the peripheral conductive material.

119. A method according to claim 110, wherein the solar cell module includes a plurality of solar cells.

120. A method according to claim 119, wherein the solar cells are electrically connected in series.

121. A power generation system comprising:
a solar cell-bearing roof comprising a roof base member provided on a partition wall which partitions a building into an indoor portion and an outdoor portion, said partition wall having an inner face on a side of said indoor portion and an outer face on a side of said outdoor portion;

a solar cell module provided on a front bee of said roof base member;

an electric wiring having a first end portion electrically connected with said solar cell module between said roof base member and aid solar cell module; and an inverter electrically connected to said electric wiring, wherein said electric wiring connected to said solar cell module extends through said roof base member such that said electric wiring passes through a wiring passage provided at a portion of said roof base member on a aide of said outdoor portion, and said electric wiring is electrically connected to said inverter through a second end portion of said electric wiring.

122. A power generation system according to claim 121, wherein said wiring passage provided at said roof base member has a through-hole at a portion thereof on said outdoor portion side, and a second end portion of said electric wiring is drawn through said through-hole.

123. A power generation system according to claim 121, wherein said roof base member comprises a sheathing roof board.

124. A power generation system according to claim 123, wherein said sheathing roof board comprises a cemented excelsior board.

125. A power generation system according to claim 121, wherein a ridge covering member is provided over said wiring passage.

126. A power generation system according to claim 122, wherein a ridge covering member is provided at said partition wall on said outdoor portion side and the through-hole is formed to penetrate said covering member.

127. A power generation system according to claim 126, wherein the through-hole comprises a pipe having an elbow inserted therein and said pipe is communicated with said wiring passage.

128. A power generation system according to claim 121, wherein said electric wiring comprises a power output wiring for outputting an electric power generated by said solar cell module.

129. A power generation system according to claim 121, wherein said solar cell module has a peripheral conductive material and said electric wiring includes an earthing wire for earthing said peripheral conductive material.

130. A power generation system according to claim 121, wherein said solar cell module includes a plurality of solar cells.

131. A power generation system according to claim 130, wherein said solar cells an electrically connected in series.

132. A building provided with a solar-cell bearing roof, comprising:
 a partition wall which partitions the building into an indoor portion and an outdoor portion, said partition wall having an inner face on a side of said indoor portion and an outer face on a side of said outdoor portion;
 a roof base member provided on said partition wall;
 a solar cell module provided on a front face of said roof base member; and
 electric wiring having a first end portion electrically connected with said solar cell module between said roof base member and said solar cell module,
 wherein said electric wiring connected to said solar cell module extends through said roof base member such that said electric wiring passes though a wiring passage provided at a portion of said roof base member on a side of said outdoor portion.

133. A building according to claim 132, wherein said wiring passage provided at said roof base member has a through-hole at a portion thereof on said outdoor portion side, and a second end portion of said electric wiling is drawn through the through-hole.

134. A building according to claim 132, wherein said roof base member comprises a sheathing roof board.

135. A building according to claim 134, wherein said sheathing roof board comprises a cemented excelsior board.

136. A building according to claim 132, wherein a ridge covering member is provided over said wiring passage.

137. A building according to claim 133, wherein a ridge covering member is provided at said partition wall on said outdoor portion side and the through-hole is provided to penetrate said covering member.

138. A building according to claim 137, wherein the through-hole comprises a pipe having an elbow inserted therein and said pipe is communicated with said wiring passage.

139. A building accenting to claim 132, wherein said electric wiring comprises a power output wiring for outputting an electric power generated by said solar cell module.

140. A building according to claim 132, wherein said solar cell module has a peripheral conductive material and said electric wiring includes an earthing wire for earthing said peripheral conductive material.

141. A building according to claim 132, wherein said solar cell module includes a plurality of solar cells.

142. A building according to claim 141, wherein said solar cells are electrically connected in series.

143. A solar cell-bearing roof comprising:
 a roof base member provided on a building having an indoor portion and an outdoor portion;
 a solar cell module provided on a front face of said roof base member; and
 electric wiring having a first end portion electrically connected with said solar cell module between said roof base member and said solar cell module,
 wherein said electric wiring connected to said solar cell module extends through said roof base member such that said electric wiring passes through a wiring passage provided at a portion of said roof base member on a side of said outdoor portion of the building.

144. A solar cell-bearing roof according to claim 143, wherein said wiring passage provided at said roof base member has a through-hole at a portion thereof on said outdoor portion side, and a second end portion of said electric wiring is drawn through the through-hole.

145. A solar cell-bearing roof according to claim 143, wherein said roof base member comprises a sheathing roof board.

146. A solar cell-bearing roof according to claim 145, wherein said sheathing roof board comprises a cemented excelsior board.

147. A solar cell-bearing roof according to claim 143, wherein a ridge covering member is provided over said wiring passage.

148. A solar cell-bearing roof according to claim 144, wherein a ridge covering member is provided at a partition wall which partitions the building to have said indoor portion and said outdoor portion and the through-hole is formed to penetrate said covering member.

149. A solar cell-bearing roof according to claim 148, wherein the through-hole comprises a pipe having an elbow inserted therein and said pipe is communicated with said wiring passage.

150. A solar cell-bearing roof according to claim 143, wherein said electric wiring comprises a power output wiring for outputting electric power generated by said solar cell module.

151. A solar cell-bearing roof according to claim 143, wherein said solar cell module has a peripheral conductive material and said electric wiring includes an earthing wire for earthing said peripheral conductive material.

152. A solar cell-bearing roof according to claim 143, wherein said solar cell module includes a plurality of solar cells.

153. A solar cell-bearing roof according to claim 152, wherein said solar cells are electrically connected in series.

154. A method for installing a solar cell-bearing roof comprising the steps of:
 a) providing a solar cell module on a front face of a roof base member provided on a building having an indoor portion and an outdoor portion;
 b) electrically connecting an electric wiring to the solar coil module through a first end portion of the electric wiring between the roof base member and the solar cell module; and
 c) drawing the electric wiring connected to the solar cell module through the roof base member such that the electric wiring passes through a wiring passage provided at a portion of the roof base member on a side of the outdoor portion.

155. A method according to claim 154, further comprising a step of forming a through-hole at a portion of the wiring passage provided at the roof base member on the outdoor portion side, wherein in the drawing step c), the electric wiring is drawn through the through-hole.

156. A method according to claim 154, wherein the roof base member comprises a sheathing roof board.

157. A method according to claim 156, wherein the sheathing roof board comprises a cemented excelsior board.

158. A method according to claim 154, wherein a ridge covering member is provided over the wiring passage.

159. A method according to claim 154, wherein a ridge covering member is provided at a partition wall which partitions the building to have the indoor portion and the outdoor portion and the through-hole is formed to penetrate the covering member 160. A method according to claim 159, wherein the through-hole comprises a pipe having an elbow inserted therein and the pipe is communicated with the wiring passage.

161. A method according to claim 154, wherein the electric wiring comprises a power output wiring for outputting an electric power generated by the solar cell module.

162. A method according to claim 154, wherein the solar cell module has a peripheral conductive material and the electric wiring includes an earthing wire for earthing the peripheral conductive material.

163. A method according to claim 154, wherein the solar cell module includes a plurality of solar cells.

164. A method according to claim 163, wherein the solar cells are electrically connected in series.

165. A power generation system comprising:
a solar cell-bearing roof comprising a roof base member provided on a building having a indoor portion and an outdoor portion;
a solar cell module provided on a front face of said roof base member;
electric wiring having a first end portion electrically connected with said solar cell module between said roof base member and said solar cell module; and
an inverter electrically connected to said electric wiring,
wherein said electric wiring connected to said solar cell module extends though said roof base member such that said electric wiring passes through a wiring passage provided at a portion of aid roof base member on a side of said outdoor portion of said building, and said electric wiring is electrically connected to said inverter through a second end portion of said electric wiring.

166. A power generation system according to claim 165, wherein said wiring passage provided at said roof base member has a through-hole at a portion thereof on said outdoor portion side, and a second end portion of said electric wiring is drawn through the through-hole.

167. A power generation system according to claim 165, wherein said roof base member comprises a sheathing roof board.

168. A power generation system according to claim 167, wherein said sheathing roof board comprises a cemented excelsior board.

169. A power generation system according to claim 165, wherein a ridge covering member is provided over said wiring passage.

170. A power generation system according to claim 166, wherein a ridge covering member is provided at a partition wall which partitions the building to have the indoor portion and the outdoor portion, and the through-hole is formed to penetrate said covering member.

171. A power generation system according to claim 170, wherein the through-hole comprises a pipe having a elbow inserted therein and said pipe is communicated with said wiring passage.

172. A power generation system according to claim 165, wherein said electric wiring comprises a power output wiring for outputting electric power generated by said solar cell module.

173. A power generation system according to claim 165, wherein said solar cell module has a peripheral conductive material and said electric wiring includes an earthing wire for earthing said peripheral conductive material.

174. A power generation system according to claim 165, wherein said solar cell module includes a plurality of solar cells.

175. A power generation system according to claim 174, wherein said solar cells are electrically connected in series.

176. A building provided with a solar cell-bearing roof, comprising:
a building having an indoor portion and an outdoor portion;
a roof base member provided on said building;
a solar cell module provided on a front face of said roof base member; and
electric wiring having a first end portion electrically connected with said solar cell module between said roof base member and said solar cell module,
wherein said electric wiring connected to said solar cell module extends through said roof base member such that said electric wiring passes through a wiring passage provided at a portion of said roof base member on a side of said outdoor portion of said building.

177. A building according to claim 176, wherein said wiring passage provided at said roof base member has a through-hole at a portion thereof on said outdoor portion side, and a second end portion of said electric wiring is drawn through the through-hole.

178. A building according to claim 176, wherein said roof base member comprises a sheathing roof board.

179. A building according to claim 178, wherein said sheathing roof bond comprises a cemented excelsior bond.

180. A building according to claim 176, wherein a ridge covering member is provided over the wiring passage.

181. A building according to claim 177, wherein a ridge covering member is provided at a partition wall which partitions said building to have said indoor portion and said outdoor portion and the through-hole is formed to penetrate said covering member.

182. A building according to claim 181, wherein the through-hole comprises a pipe having an elbow inserted therein and said pipe is communicated with said wiring passage.

183. A building according to claim 176, wherein said electric wiring comprises a power output wiring for outputting an electric power generated by said solar cell module.

184. A building according to claim 176, wherein said solar cell module has a peripheral conductive material and said electric wiring includes an earthing wire for earthing said peripheral conductive material.

185. A building according to claim 176, wherein said solar cell module includes a plurality of solar cells.

186. A building according to claim 185, wherein said solar cells are electrically connected in series.

187. A solar cell-bearing roof comprising:
a roof base member provided on a partition wall which partitions a building into an indoor portion and an outdoor portion, said partition wall having an inner face on a side of said indoor portion and an outer face on a side of said outdoor portion;

a solar cell module provided on a front face of said roof base member and electric wiring having a first end portion electrically connected with said solar cell module, wherein said electric wiring connected to said solar cell module extends through said roof base member such that a second end portion of said electric wiring reaches a desired position under a back face of said roof base member while passing through a through-hole provided at said roof base member, the through-hole being open at a position of said back face of said roof base member and the through-hole being situated outside said inner face of said partition wall.

188. A solar cell-bearing roof according to claim 187, wherein said roof base member comprises a sheathing roof board.

189. A solar cell-bearing roof according to claim 187, further comprising a roof accommodating member provided at an end portion of said roof base member, wherein said second end portion of said electric wiring is drawn to the outside through a wire-drawing means provided at said roof accommodating member.

190. A solar cell-bearing roof according to claim 189, wherein said roof accommodating member comprises a wide lath having a through-hole, wherein said second end portion of said electric wiring is drawn to the outside through the through-hole.

191. A solar cell-bearing roof according to claim 189, wherein said roof accommodating member comprises a wide lath having a first through-hole, a fascia board having a second through-hole, and a pipe for communicating the first through-hole and the second through-hole, wherein said second aid portion of said electric wiring is drawn to the outside through said pipe.

192. A solar cell-bearing roof according to claim 187, wherein said roof base member comprises a shed roof having a ridge accommodating member, said ridge accommodating member having the through-hole, wherein said second end portion of said electric wiring is drawn to the outside through the through-hole.

193. A solar cell-homing roof according to claim 187, wherein said solar cell module has a peripheral conductive material and said electric wiring includes an earthing wire for earthing said peripheral conductive material.

194. A solar cell-bearing roof according to claim 187, further comprising a conductive roof accommodating member provided at an end portion of said roof base member, said solar cell module having a peripheral conductive material, wherein said electric wiring electrically connects said peripheral conductive material, and said conductive roof accommodating member is electrically grounded by means of an earthing wire.

195. A solar cell-bearing roof according to claim 187, further comprising a plurality of spacers disposed between said roof base member and said solar cell module.

196. A solar cell-bearing roof according to claim 187, wherein said solar cell module includes a plurality of solar cells.

197. A solar cell-bearing roof according to claim 196, wherein said solar cells are electrically connected in series.

198. A solar cell-bearing roof according to claim 187, further comprising a plurality of partition walls forming an exterior portion within a perimeter of said roof base member.

199. A solar cell-bearing roof according to claim 198, wherein said second end portion of said electric wiring reaches a position on said back face of said roof base member, with said position being situated on said exterior portion side.

200. A method for installing a solar cell-bearing roof, comprising the steps of:

a) providing a solar cell module on a front face of a roof base member provided on a partition wall which partitions a building into an indoor portion and an outdoor portion, the partition wall having an inner face on a side of the indoor portion and an outer face on a side of the outdoor portion;

b) electrically connected a first end portion of an electric wiring with the solar cell module between the roof base member and the solar cell module; and c) drawing the electric wiring connected to the solar cell module through the roof base member such that a second end portion of the electric wiring reaches a desired position under a back face of the roof base member while passing through a through-hole provided at the roof base member, the through-hole being open at a position of the back face of the roof base member and the through-hole being situated outside the inner face of the partition wall.

201. A method according to claim 200, wherein the roof base member comprises a sheathing roof board.

202. A method according to claim 200, farther comprising a step of providing a roof accommodating member with wire-drawing means at a roof end portion of the building, wherein in the drawing step c), the second end portion of the electric wiring is drawn through the wire-drawing means of the roof accommodating member.

203. A method according to claim 202, wherein the roof accommodating member comprises a wide lath, a through-hole is formed at the wide lath, wherein in the drawing step, the second end portion of the electric wiring is drawn through the through-hole.

204. A method according to claim 202, wherein the roof accommodating member comprises a wide lath and a fascia board, a first through-hole is formed at the wide lath, a second through-hole is formed at the fascia board, and the first through-hole and the second through-hole are in communication by a pipe, wherein in the drawing step, the second end portion of the electric wiring is drawn through the pipe.

205. A method according to claim 200, wherein the solar cell-bearing roof comprises a shed roof having a ridge accommodating member, the through-hole is formed at the ridge accommodating member, wherein in the drawing step c), the second end portion of the electric wiring is drawn through the through-hole.

206. A method according to claim 200, wherein the electric wiring comprises a power output wiring for outputting electric power generated by the solar cell.

207. A method according to claim 200, wherein the solar cell module has a peripheral conductive material and the electric wiring includes an earthing wire for earthing the peripheral conductive material.

208. A method according to claim 200, wherein the solar cell module has a peripheral conductive material, a conductive roof accommodating member is provided at an end portion of the roof base member, and the drawing step c) includes the steps of electrically connecting the peripheral conductive material and the conductive roof accommodating member by the electric wiring and electrically grounding the conductive roof accommodating member by means of an earthing wire.

209. A method according to claim 200, wherein the solar cell module includes a plurality of solar cells.

210. A method wording to claim 209, wherein the solar cells are electrically connected in series.

211. A power generation system comprising:
a solar cell-bearing roof including a solar cell module which is provided on a front face of a roof base member provided on a partition wall which partitions a building into an indoor portion and a outdoor portion, said partition wall having an inner face on a side of said indoor portion and an outer face on a side of said outdoor portion;
electric wiring having a first end portion electrically connected with said solar cell module between said roof base member and said solar cell module; and
an inverter electrically connected to said electric wiring, wherein said electric wiring connected to said solar cell module extends through said roof base member such that a second end portion of said electric wiring reaches a desired position under a back face of said roof base member while passing through a trough-hole provided at said roof base member, the through-hole being open at a position of said back face of said roof base member and the through-hole being situated outside said inner face of said partition wall.

212. A power generation system according to claim 211, wherein said roof base member comprises a sheathing roof board.

213. A power generation system according to claim 211, further comprising a roof accommodating member provided at an end portion of said roof base member, wherein said second end portion of said electric wiring is drawn to the outside through wire-drawing means provided at said roof accommodating member.

214. A power generation system according to claim 213, wherein said roof accommodating member comprises a wide lath having a through-hole, wherein said second end portion of said electric wiring is drawn to the outside through the through-hole.

215. A power generation system according to claim 213, wherein said roof accommodating member comprises a wide lath having a first through-hole, a fascia board having a second through-hole, and a pipe for communicating the first through-hole and the second through-hole, wherein said second end portion of said electric wiring is drawn to the outside through said pipe.

216. A power generation system according to claim 211, wherein said roof base member comprises a shed roof having a ridge accommodating member, said ridge accommodating member having the through-hole, wherein said second end portion of said electric wiring is drawn to the outside through the through-hole.

217. A power generation system according to claim 211, wherein said solar cell module has a peripheral conductive material and said electric wiring includes an earthing wire for earthing said peripheral conductive material.

218. A power generation system according to claim 211, further comprising a conductive roof accommodating member provided at an end portion of said roof base member, said solar cell module having a peripheral conductive material, wherein said electric wiring electrically connects said peripheral conductive material, and said conductive roof accommodating member is electrically grounded by means of an earthing wire.

219. A power generation system according to claim 211, further comprising a plurality of spacers disposed between said roof base member and said solar cell module.

220. A power generation system according to claim 211, wherein said solar cell module includes a plurality of solar cells.

221. A power generation system according to claim 220, wherein said solar cells are electrically connected in series.

222. A power generation system according to claim 211, further comprising a plurality of partition walls forming an exterior portion within a perimeter of said roof base member.

223. A power generation system according to claim 222, wherein said second end portion of said electric wiring reaches a position on said back face of said roof base member, with said position being situated on said exterior portion side.

224. A building provided with a solar cell-bearing roof, comprising:
a building;
a roof base member provided on a partition wall which partitions said building into an indoor portion and an outdoor portion, said partition wall having an inner face on a side of said indoor portion and an outer face on a side of said outdoor portion;
a solar cell module provided on a front face of said roof base member and
electric wiring having a first end portion electrically connected with said solar cell module,
wherein said electric wiring connected to said solar cell module extends through said roof base member such that a second end portion of said electric wiring reaches a desired position under a back face of said roof base member while passing through a through-hole provided at said roof base member, the through-hole being open at a position of said back face of said roof base member and the through-hole being situated outside said inner face of said partition wall.

225. A building according to claim 224, wherein said roof base member comprises a sheathing roof board.

226. A building according to claim 224, further comprising a roof accommodating member provided at an end portion of said roof base member, wherein said second end portion of said electric wiring is drawn to the outside through wire-drawing means provided at said roof accommodating member.

227. A building according to claim 226, wherein said roof accommodating member comprises a wide lath having a through-hole, wherein said second end portion of said electric wiring is drawn to the outside through the through-hole.

228. A building according to claim 226, wherein said roof accommodating member comprises a wide lath having a first through-hole, a fascia board having a second through-hole, and a pipe for communicating the first through-hole and the second through-hole, wherein said second end portion of said electric wiring is drawn to the outside through said pipe.

229. A building according to claim 224, wherein said roof base member comprises a shed roof having a ridge accommodating member, said ridge accommodating member having the through-hole, wherein said second end portion of said electric wiring is drawn to the outside through the through-hole.

230. A building according to claim 224, wherein said solar cell module has a peripheral conductive material and said electric wiring includes an earthing wire for earthing said peripheral conductive material.

231. A building according to claim 224, further comprising a conductive roof accommodating member provided at an end portion of said roof base member, said solar cell module having a peripheral conductive material, wherein said electric wiring electrically connects said peripheral conductive material, and said conductive roof accommodating member is electrically grounded by means of an earthing wire.

232. A building according to claim 224, further comprising a plurality of spacers disposed between said roof base member and said solar cell module.

233. A building according to claim 224, wherein said solar cell module includes a plurality of solar cells.

234. A building according to claim 233, wherein said solar cells are electrically connected in series.

235. A building according to claim 233, further comprising a plurality of partition walls forming an exterior portion within, perimeter of said roof base member.

236. A building according to claim 235, wherein said second end portion of said electric wiring reaches a position on said back face of said roof base member, with said position being situated on said exterior portion side.

* * * * *

UNITED STATES PATENT AND TRADEMARK OFFICE
CERTIFICATE OF CORRECTION

PATENT NO. : 6,606,830 B2
DATED : August 19, 2003
INVENTOR(S) : Yoshitaka Nagao et al.

It is certified that error appears in the above-identified patent and that said Letters Patent is hereby corrected as shown below:

Column 16,
Line 7, "a through" should read -- and a fascia board, a first through-hole is formed --.
Lines 8 and 9, "hole is formed at the wide lath, wherein in the drawing step, the electric wiring is drawn through the throughhole." should read -- at the wide lath, a second through-hole is formed at the fascia board, and the first through-hole and the second through-hole are in communication by a pipe, wherein in the drawing step, the second end portion of the electric wiring is drawn through the pipe. --.
Line 11, "cell-baring" should read -- cell-bearing --.

Column 17,
Line 15, "cell-baring" should read -- cell-bearing --.
Line 54, "portion" should read -- position --.

Column 19,
Line 23, "cell-hearing" should read -- cell-bearing --.
Line 38, "aid" should read -- and --.

Column 23,
Line 28, "coveting" should read -- covering --.
Line 29, "aide," should read -- side, --.
Line 47, "m" should read -- in --.
Line 48, "coil-bearing" should read -- cell-bearing --.

Column 24,
Line 36, "bee" should read -- face --.
Line 40, "aid" should read -- said --.
Line 47, "aide" should read -- side --.

Column 25,
Line 41, "wiling" should read -- wiring --.
Line 57, "accenting" should read -- according --.

Column 26,
Line 56, "coil" should read -- cell --.

Column 27,
Line 43, "aid" should read -- said --.

Column 28,
Line 39, "bond" should read -- board -- and "bond." should read -- board. --.

UNITED STATES PATENT AND TRADEMARK OFFICE
CERTIFICATE OF CORRECTION

PATENT NO. : 6,606,830 B2
DATED : August 19, 2003
INVENTOR(S) : Yoshitaka Nagao et al.

It is certified that error appears in the above-identified patent and that said Letters Patent is hereby corrected as shown below:

Column 29,
Line 2, "member" should read -- member; --.
Line 32, "aid" should read -- end --.
Line 40, "cell-homing" should read -- cell-bearing --.

Column 30,
Line 66, "wording" should read -- according --.

Column 31,
Line 16, "trough-hole" should read -- through-hole --.

Column 32,
Line 20, "member" should read -- member; --.

Column 34,
Line 3, "within," should read -- within a --.

Signed and Sealed this

Eleventh Day of May, 2004

JON W. DUDAS
*Acting Director of the United States Patent and Trademark Office*